US012719524B2

(12) United States Patent
Nie

(10) Patent No.: US 12,719,524 B2

(45) Date of Patent: Aug. 25, 2026

(54) SPREAD SPECTRUM CONTROL METHOD AND APPARATUS

(71) Applicant: Huawei Technologies Co., Ltd., Shenzhen (CN)

(72) Inventor: Er Nie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 99 days.

(21) Appl. No.: 18/760,636

(22) Filed: Jul. 1, 2024

(65) Prior Publication Data

US 2024/0356579 A1 Oct. 24, 2024

Related U.S. Application Data

(63) Continuation of application No. PCT/CN2022/126718, filed on Oct. 21, 2022.

(30) Foreign Application Priority Data

Dec. 31, 2021 (CN) ........................ 202111674448.8

(51) Int. Cl.

*H04B 1/707* (2011.01)
*H04L 7/027* (2006.01)

(52) U.S. Cl.

CPC ............ *H04B 1/707* (2013.01); *H04L 7/027* (2013.01)

(58) Field of Classification Search

CPC ........ H04B 1/69; H04B 1/707; H04B 1/7163; H04B 1/7176; H04L 7/027; G06F 11/1004; G06F 13/4022; G06F 13/4291; G06F 2213/0026

USPC ........ 375/130, 133, 141, 260; 370/328, 342, 370/344, 347, 349

See application file for complete search history.

(56) References Cited

U.S. PATENT DOCUMENTS

| | | | | |
|---|---|---|---|---|
| 5,696,762 | A * | 12/1997 | Natali | H04B 7/216 370/320 |
| 2019/0041898 | A1 | 2/2019 | Harriman et al. | |
| 2021/0007072 | A1* | 1/2021 | Wu | H04W 72/53 |
| 2021/0089421 | A1 | 3/2021 | Sharma et al. | |
| 2023/0379739 | A1* | 11/2023 | Kim | H04W 24/10 |

FOREIGN PATENT DOCUMENTS

| | | | |
|---|---|---|---|
| CN | 102932927 | A | 2/2013 |
| CN | 107341124 | A | 11/2017 |
| CN | 109391455 | A | 2/2019 |
| CN | 112399595 | A | 2/2021 |
| WO | 2021189267 | A1 | 9/2021 |

* cited by examiner

*Primary Examiner* — Young T. Tse

(74) *Attorney, Agent, or Firm* — Conley Rose, P.C.

(57) ABSTRACT

A first apparatus receives a first training sequences block (TSB) sent by a second apparatus, where the first TSB includes second spread spectrum capability information of the second apparatus. The first apparatus determines, based on first spread spectrum capability information of the first apparatus and the second spread spectrum capability information, whether to enable spectrum spreading of the second apparatus. The first apparatus sends a second TSB to the second apparatus, where the second TSB includes first indication information, and the first indication information indicates the second apparatus to enable or not to enable the spectrum spreading.

20 Claims, 8 Drawing Sheets

SPREAD SPECTRUM CONTROL METHOD AND APPARATUS

CROSS-REFERENCE TO RELATED APPLICATIONS

This is a continuation of International Patent Application No. PCT/CN2022/126718 filed on Oct. 21, 2022, which claims priority to Chinese Patent Application No. 202111674448.8 filed on Dec. 31, 2021. The disclosures of the aforementioned applications are hereby incorporated by reference in their entireties.

TECHNICAL FIELD

This disclosure relates to the communication field, and more specifically, to a spread spectrum control method and an apparatus.

BACKGROUND

In a modern computer system, a Peripheral Component Interconnect Express (PCIe) is widely used as a key high-speed interconnection interface. A high-speed serial link on a printed circuit board (PCB) may cause electromagnetic interference to other circuits due to a high frequency and concentrated spectra.

A spread-spectrum clocking (SSC) technology is a technology used by a PCIe physical layer to reduce electromagnetic interference produced by serializer/deserializer (SerDes) differential signals to other devices. After the SSC is enabled, a low-frequency clock is used to modulate a reference clock. Noise spectra of low-voltage differential signaling (LVDS) are less concentrated, to improve electromagnetic compatibility.

Currently, software developers can learn of, in advance only based on a hardware interconnection form of a product and the like, related information about whether the product on a high-speed serial link supports spectrum spreading, and this process is complicated. After learning of in advance the related information about whether the spectrum spreading is supported, the software developers need to develop software for controlling spectrum spreading enabling/disabling. Because hardware interconnection forms in different products are diverse and connected components are vendor-specific, software development costs are high and maintenance workload is heavy. In addition, when there is a retimer on the high-speed serial link, the retimer may be incapable of supporting the SSC. As a result, the application of the SSC in the product is limited.

SUMMARY

This disclosure provides a spread spectrum control method and an apparatus, to learn of spread spectrum capability information of an apparatus on a high-speed serial link, so as to indicate whether to enable spectrum spreading.

According to a first aspect, a spread spectrum control method is provided, and is applicable to a wired high-speed serial link. The method may be performed by a network apparatus, a chip on a network apparatus side, or a chip system on a network apparatus side. The method includes: a first apparatus receives a first training sequences block (TSB) sent by a second apparatus, where the first TSB includes second spread spectrum capability information of the second apparatus. The first apparatus sends a second TSB to the second apparatus, where the second TSB includes first indication information, and the first indication information indicates the second apparatus to enable or not to enable spectrum spreading.

Based on the foregoing technical solution, the second apparatus may send the second spread spectrum capability information of the second apparatus to the first apparatus, and the first apparatus receives the second spread spectrum capability information sent by the second apparatus, that is, the spread spectrum capability information may be exchanged between the first apparatus and the second apparatus. The first apparatus may determine, based on the second spread spectrum capability information and first spread spectrum capability information of the first apparatus, whether to enable the spectrum spreading of the second apparatus and spectrum spreading of the first apparatus. The first apparatus may send the first indication information to the second apparatus, where the first indication information indicates the second apparatus to enable or not to enable the spectrum spreading. In other technologies, a software developer can learn of, in advance only based on information such as a hardware interconnection form of an apparatus, whether the apparatus in a wired high-speed serial link supports spectrum spreading, and this process is complicated. After learning of in advance the related information about whether the spectrum spreading is supported, the software developer needs to develop software for controlling spectrum spreading enabling/disabling. Because hardware interconnection forms in different products are diverse and connected components come from different vendors, software development costs are high and maintenance workload is heavy. Compared with a method of learning of, in advance based on the hardware interconnection form of the apparatus, whether the apparatus in the wired high-speed serial link supports the spectrum spreading and developing the software for controlling spectrum spreading enabling/disabling, a method for determining and indicating, by exchanging spread spectrum capability information between different apparatuses in this solution, whether to enable spectrum spreading, is more convenient and more efficient. Therefore, according to the spread spectrum control method provided in this disclosure, spread spectrum capability information of the apparatus in the wired high-speed serial link can be learned of, so that whether to enable the spectrum spreading can be determined and indicated.

With reference to the first aspect, in some implementations of the first aspect, before the first apparatus sends the second TSB to the second apparatus, the method further includes: the first apparatus determines, based on the first spread spectrum capability information and the second spread spectrum capability information, whether to enable the spectrum spreading of the second apparatus, where the first spread spectrum capability information is spread spectrum capability information of the first apparatus.

With reference to the first aspect, in some implementations of the first aspect, the first spread spectrum capability information includes at least one of a first spread spectrum frequency offset supported by the first apparatus or indication information indicating whether the first apparatus supports the spectrum spreading. The second spread spectrum capability information includes at least one of a second spread spectrum frequency offset supported by the second apparatus or indication information indicating whether the second apparatus supports the spectrum spreading. It should be understood that the spread spectrum frequency offset may be understood as that a frequency of a reference clock provided to a SerDes periodically changes within a specific range after the spectrum spreading is enabled, and a maximum value of a frequency offset from a reference is the spread spectrum frequency offset. It should be understood that the spread spectrum frequency offset may also be referred to as a spread spectrum amplitude.

With reference to the first aspect, in some implementations of the first aspect, that the first apparatus determines, based on the first spread spectrum capability information and the second spread spectrum capability information, whether to enable the spectrum spreading of the second apparatus includes: if the first spread spectrum capability information indicates that the first apparatus supports the spectrum spreading, and the second spread spectrum capability information indicates that the second apparatus supports the spectrum spreading, the first apparatus determines to enable the spectrum spreading of the second apparatus; or if the first spread spectrum capability information indicates that the first apparatus does not support the spectrum spreading, or the second spread spectrum capability information indicates that the second apparatus does not support the spectrum spreading, or if the first spread spectrum capability information indicates that the first apparatus does not support the spectrum spreading and the second spread spectrum capability information indicates that the second apparatus does not support the spectrum spreading, the first apparatus determines not to enable the spectrum spreading of the second apparatus.

It should be understood that, if both the first apparatus and the second apparatus support the spectrum spreading, the first apparatus determines to enable the spectrum spreading of the second apparatus and also enables the spectrum spreading of the first apparatus. If either of the first apparatus and the second apparatus does not support the spectrum spreading or neither of the first apparatus nor the second apparatus supports the spectrum spreading, the first apparatus determines not to enable the spectrum spreading of the second apparatus or not to enable the spectrum spreading of the first apparatus.

With reference to the first aspect, in some implementations of the first aspect, if the first apparatus determines to enable the spectrum spreading of the second apparatus, the first apparatus determines a first target spread spectrum frequency offset based on the first spread spectrum frequency offset and the second spread spectrum frequency offset. The first indication information carries the first target spread spectrum frequency offset, and the first indication information indicates the second apparatus to enable the spectrum spreading based on the first target spread spectrum frequency offset.

With reference to the first aspect, in some implementations of the first aspect, that the first apparatus determines a first target spread spectrum frequency offset based on the first spread spectrum frequency offset and the second spread spectrum frequency offset includes: if the first spread spectrum frequency offset is greater than or equal to the second spread spectrum frequency offset, the first target spread spectrum frequency offset is equal to the first spread spectrum frequency offset; or if the first spread spectrum frequency offset is less than the second spread spectrum frequency offset, the first target spread spectrum frequency offset is equal to the second spread spectrum frequency offset. It should be understood that determining a large spread spectrum frequency offset as a target spread spectrum frequency offset can avoid insufficient compensation for a frequency offset and prevent overflow of transmitted data.

With reference to the first aspect, in some implementations of the first aspect, that a first apparatus receives a first TSB sent by a second apparatus includes: the first apparatus receives, from a third apparatus, the first TSB sent by the second apparatus, where the first TSB further includes third spread spectrum capability information of the third apparatus. That the first apparatus sends a second TSB to the second apparatus includes: the first apparatus sends the second TSB to the second apparatus via the third apparatus, where the second TSB further includes second indication information, and the second indication information indicates the third apparatus to enable or not to enable spectrum spreading.

In the foregoing solution, the third apparatus exists between the first apparatus and the second apparatus, and the third apparatus may be a retimer. The first apparatus receives, from the third apparatus, the first TSB sent by the second apparatus, where the first TSB includes the second spread spectrum capability information of the second apparatus and the third spread spectrum capability information of the third apparatus. The first apparatus determines, based on the first spread spectrum capability information of the first apparatus, the second spread spectrum capability information, and the third spread spectrum capability information, whether to enable the spectrum spreading of the third apparatus and the spectrum spreading of the second apparatus. The first apparatus sends the second TSB to the second apparatus via the third apparatus, where the second TSB includes the first indication information indicating the second apparatus to enable the spectrum spreading and the second indication information indicating the third apparatus to enable the spectrum spreading. In this solution, apparatuses on a high-speed serial link can exchange spread spectrum capability information, and another apparatus can be indicated to enable or not to enable spectrum spreading by sending indication information.

With reference to the first aspect, in some implementations of the first aspect, before the first apparatus sends the second TSB to the second apparatus via the third apparatus, the method further includes: the first apparatus determines, based on the first spread spectrum capability information, the second spread spectrum capability information, and the third spread spectrum capability information, whether to enable the spectrum spreading of the third apparatus and whether to enable the spectrum spreading of the second apparatus.

With reference to the first aspect, in some implementations of the first aspect, the method further includes: the first apparatus sends a third TSB to the second apparatus via the third apparatus, where the third TSB that arrives at the second apparatus includes the first spread spectrum capability information of the first apparatus and the third spread spectrum capability information, and the third spread spectrum capability information includes at least one of a third spread spectrum frequency offset supported by the third apparatus or indication information indicating whether the third apparatus supports the spectrum spreading.

With reference to the first aspect, in some implementations of the first aspect, that the first apparatus determines, based on the first spread spectrum capability information, the second spread spectrum capability information, and the third spread spectrum capability information, whether to enable the spectrum spreading of the third apparatus and whether to enable the spectrum spreading of the second apparatus includes: if the first spread spectrum capability information indicates that the first apparatus supports the spectrum spreading, the second spread spectrum capability information indicates that the second apparatus supports the spectrum spreading, and the third spread spectrum capability information indicates that the third apparatus supports the spectrum spreading, the first apparatus determines to enable the spectrum spreading of the third apparatus and to enable the spectrum spreading of the second apparatus; or if the first spread spectrum capability information indicates that the first apparatus does not support the spectrum spreading, the second spread spectrum capability information indicates that the second apparatus does not support the spectrum spreading, and/or the third spread spectrum capability information indicates that the third apparatus does not support the spectrum spreading, the first apparatus determines not to enable the spectrum spreading of the third apparatus and not to enable the spectrum spreading of the second apparatus.

With reference to the first aspect, in some implementations of the first aspect, that the first apparatus determines, based on the first spread spectrum capability information, the second spread spectrum capability information, and the third spread spectrum capability information, whether to enable the spectrum spreading of the third apparatus and whether to enable the spectrum spreading of the second apparatus includes: if the first spread spectrum capability information indicates that the first apparatus supports the spectrum spreading, the second spread spectrum capability information indicates that the second apparatus does not support the spectrum spreading, and the third spread spectrum capability information indicates that the third apparatus supports the spectrum spreading, the first apparatus determines to enable the spectrum spreading of the third apparatus and not to enable the spectrum spreading of the second apparatus; or if the first spread spectrum capability information indicates that the first apparatus does not support the spectrum spreading, the second spread spectrum capability information indicates that the second apparatus supports the spectrum spreading, and the third spread spectrum capability information indicates that the third apparatus supports the spectrum spreading, the first apparatus determines to enable the spectrum spreading of the third apparatus and to enable the spectrum spreading of the second apparatus.

It should be understood that the first apparatus directly interacts with the third apparatus, and the third apparatus directly interacts with the second apparatus. If the first apparatus and the third apparatus support the spectrum spreading, but the second apparatus does not support the spectrum spreading, the spectrum spreading of the first apparatus and the spectrum spreading of the third apparatus may be enabled. If the spectrum spreading of the second apparatus is not enabled, data transmission is not affected. If the third apparatus and the second apparatus support the spectrum spreading, but the first apparatus does not support the spectrum spreading, the spectrum spreading of the third apparatus and the spectrum spreading of the second apparatus may be enabled. If the spectrum spreading of the first apparatus is not enabled, data transmission is not affected.

With reference to the first aspect, in some implementations of the first aspect, if the first apparatus determines to enable the spectrum spreading of the third apparatus and to enable the spectrum spreading of the second apparatus, the first apparatus determines a second target spread spectrum frequency offset based on the first spread spectrum frequency offset, the second spread spectrum frequency offset, and the third spread spectrum frequency offset. Each of the first indication information and the second indication information carries the second target spread spectrum frequency offset. The first indication information indicates the second apparatus to enable the spectrum spreading based on the second target spread spectrum frequency offset, and the second indication information indicates the third apparatus to enable the spectrum spreading based on the second target spread spectrum frequency offset.

With reference to the first aspect, in some implementations of the first aspect, the second target spread spectrum frequency offset is a maximum spread spectrum frequency offset in the first spread spectrum frequency offset, the second spread spectrum frequency offset, and the third spread spectrum frequency offset.

With reference to the first aspect, in some implementations of the first aspect, the TSB includes a type indication field, a payload field, and a cyclic redundancy check (CRC) field, where the type indication field indicates that the TSB is a discovery TSB or a configuration TSB, the payload field is used to carry the spread spectrum capability information or the indication information indicating that the spectrum spreading is enabled or not enabled, and the CRC field is used to check the TSB.

With reference to the first aspect, in some implementations of the first aspect, when the TSB is the discovery TSB, a first bit in the payload field is used to carry the first spread spectrum capability information, a second bit in the payload field is used to carry the second spread spectrum capability information, and a third bit in the payload field is used to carry the third spread spectrum capability information; or when the TSB is a configuration TSB, a first bit in the payload field is used to carry the first indication information, and a second bit in the payload field is used to carry the second indication information.

With reference to the first aspect, in some implementations of the first aspect, enabling spectrum spreading includes: modulating, by a clock chip or a spread spectrum generator, a reference clock by using a low-frequency clock; and not enabling the spectrum spreading includes skipping modulating the reference clock by the clock chip or the spread spectrum generator.

According to a second aspect, a spread spectrum control method is provided, and is applicable to a wired high-speed serial link. The method may be performed by a network apparatus, a chip on a network apparatus side, or a chip system on a network apparatus side. The method includes: a second apparatus sends a first TSB to a first apparatus, where the first TSB includes second spread spectrum capability information of the second apparatus, and the second spread spectrum capability information is used by the first apparatus to determine whether to enable spectrum spreading of the second apparatus. The second apparatus receives a second TSB sent by the first apparatus, where the second TSB includes first indication information, and the first indication information indicates the second apparatus to enable or not to enable the spectrum spreading.

Based on the foregoing technical solution, the second apparatus sends the first TSB to the first apparatus via a third apparatus, where the first TSB that arrives at the first apparatus includes the second spread spectrum capability information of the second apparatus and third spread spectrum capability information of the third apparatus. The first apparatus may determine, based on the second spread spectrum capability information, the third spread spectrum capability information, and first spread spectrum capability information of the first apparatus, whether to enable the spectrum spreading of the second apparatus, whether to enable spectrum spreading of the third apparatus, and whether to enable spectrum spreading of the first apparatus. The first apparatus sends the second TSB to the second apparatus via the third apparatus, where the second TSB includes the first indication information and second indication information, the first indication information indicates the second apparatus to enable or not to enable the spectrum spreading, and the second indication information indicates the third apparatus to enable or not to enable the spectrum spreading. Therefore, in the method, spread spectrum capability information of an apparatus in the wired high-speed serial link can be learned of through interaction, and whether to enable spectrum spreading can be determined based on an indication.

With reference to the second aspect, in some implementations of the second aspect, the method further includes: the second apparatus receives a third TSB sent by the first apparatus, where the third TSB includes the first spread spectrum capability information of the first apparatus.

With reference to the second aspect, in some implementations of the second aspect, the first spread spectrum capability information includes at least one of a first spread spectrum frequency offset supported by the first apparatus or indication information indicating whether the first apparatus supports the spectrum spreading. The second spread spectrum capability information includes at least one of a second spread spectrum frequency offset supported by the second apparatus or indication information indicating whether the second apparatus supports the spectrum spreading.

With reference to the second aspect, in some implementations of the second aspect, that a second apparatus sends a first TSB to a first apparatus includes: the second apparatus sends the first TSB to the first apparatus via the third apparatus, where the first TSB that arrives at the first apparatus includes the third spread spectrum capability information of the third apparatus and the second spread spectrum capability information, and the third spread spectrum capability information includes at least one of a third spread spectrum frequency offset supported by the third apparatus or indication information indicating whether the third apparatus supports the spectrum spreading. That the second apparatus receives a second TSB sent by the first apparatus includes: the second apparatus receives, from the third apparatus, the second TSB sent by the first apparatus, where the second TSB further includes the second indication information, and the second indication information indicates the third apparatus to enable or not to enable the spectrum spreading.

With reference to the second aspect, in some implementations of the second aspect, the method further includes: the second apparatus receives, from the third apparatus, the third TSB sent by the first apparatus, where the third TSB includes the first spread spectrum capability information of the first apparatus and the third spread spectrum capability information.

With reference to the second aspect, in some implementations of the second aspect, the TSB includes a type indication field, a payload field, and a CRC field, where the type indication field indicates that the TSB is a discovery TSB or a configuration TSB, the payload field is used to carry the spread spectrum capability information or the indication information indicating that the spectrum spreading is enabled or not enabled, and the CRC field is used to check the TSB.

With reference to the second aspect, in some implementations of the second aspect, when the TSB is the discovery TSB, a first bit in the payload field is used to carry the first spread spectrum capability information, a second bit in the payload field is used to carry the second spread spectrum capability information, and a third bit in the payload field is used to carry the third spread spectrum capability information; or when the TSB is the configuration TSB, a first bit in the payload field is used to carry the first indication information, and a second bit in the payload field is used to carry the second indication information.

With reference to the second aspect, in some implementations of the second aspect, enabling spectrum spreading includes: modulating, by a clock chip or a spread spectrum generator, a reference clock by using a low-frequency clock; and not enabling the spectrum spreading includes skipping modulating the reference clock by the clock chip or the spread spectrum generator.

According to a third aspect, a spread spectrum control method is provided, and is applicable to a wired high-speed serial link. The method may be performed by a network apparatus, a chip on a network apparatus side, or a chip system on a network apparatus side. The method includes: a third apparatus receives a first TSB sent by a second apparatus, where the first TSB includes second spread spectrum capability information of the second apparatus. The third apparatus updates the first TSB, where an updated first TSB includes third spread spectrum capability information of the third apparatus and the second spread spectrum capability information, and the second spread spectrum capability information and the third spread spectrum capability information are used by a first apparatus to determine whether to enable spectrum spreading of the third apparatus and whether to enable spectrum spreading of the second apparatus. The third apparatus sends the updated first TSB to the first apparatus. The third apparatus receives a second TSB sent by the first apparatus, where the second TSB includes first indication information and second indication information, the first indication information indicates the second apparatus to enable or not to enable the spectrum spreading, and the second indication information indicates the third apparatus to enable or not to enable the spectrum spreading. The third apparatus determines, based on the second indication information, to enable or not to enable the spectrum spreading of the third apparatus. The third apparatus sends the second TSB to the second apparatus.

Based on the foregoing technical solution, the third apparatus may send the second spread spectrum capability information of the second apparatus and the third spread spectrum capability information of the third apparatus to the first apparatus. The first apparatus may determine, based on the second spread spectrum capability information, the third spread spectrum capability information, and first spread spectrum capability information of the first apparatus, whether to enable the spectrum spreading of the second apparatus, whether to enable the spectrum spreading of the third apparatus, and whether to enable spectrum spreading of the first apparatus. The third apparatus receives and forwards the second TSB sent by the first apparatus, where the second TSB includes the first indication information and the second indication information, the first indication information indicates the second apparatus to enable or not to enable the spectrum spreading, and the second indication information indicates the third apparatus to enable or not to enable the spectrum spreading. Therefore, in the method, spread spectrum capability information of an apparatus in the wired high-speed serial link can be learned of through interaction, and whether to enable spectrum spreading can be determined based on an indication.

With reference to the third aspect, in some implementations of the third aspect, the method further includes: the third apparatus receives a third TSB sent by the first apparatus, where the third TSB includes the first spread spectrum capability information of the first apparatus. The third apparatus updates the third TSB, where an updated third TSB includes the third spread spectrum capability information of the third apparatus and the first spread spectrum capability information. The third apparatus sends the updated third TSB to the second apparatus.

With reference to the third aspect, in some implementations of the third aspect, the first spread spectrum capability information includes at least one of a first spread spectrum frequency offset supported by the first apparatus or indication information indicating whether the first apparatus supports the spectrum spreading. The second spread spectrum capability information includes at least one of a second spread spectrum frequency offset supported by the second apparatus or indication information indicating whether the second apparatus supports the spectrum spreading. The third spread spectrum capability information includes at least one of a third spread spectrum frequency offset supported by the third apparatus or indication information indicating whether the third apparatus supports the spectrum spreading.

According to a fourth aspect, a communication apparatus is provided. The apparatus may be the first apparatus according to the first aspect, and the apparatus includes: a receiving module, configured to receive a first TSB sent by a second apparatus, where the first TSB includes second spread spectrum capability information of the second apparatus; and a sending module, configured to send a second TSB to the second apparatus, where the second TSB includes first indication information, and the first indication information indicates the second apparatus to enable or not to enable spectrum spreading.

With reference to the fourth aspect, in some implementations of the fourth aspect, the apparatus further includes a control module, configured to determine, based on first spread spectrum capability information and the second spread spectrum capability information, whether to enable the spectrum spreading of the second apparatus, where the first spread spectrum capability information is spread spectrum capability information of the apparatus.

With reference to the fourth aspect, in some implementations of the fourth aspect, the sending module is further configured to send a third TSB to the second apparatus, where the third TSB includes the first spread spectrum capability information, and the first spread spectrum capability information is the spread spectrum capability information of the apparatus.

With reference to the fourth aspect, in some implementations of the fourth aspect, the first spread spectrum capability information includes at least one of a first spread spectrum frequency offset supported by the apparatus or indication information indicating whether the apparatus supports spectrum spreading. The second spread spectrum capability information includes at least one of a second spread spectrum frequency offset supported by the second apparatus or indication information indicating whether the second apparatus supports the spectrum spreading.

With reference to the fourth aspect, in some implementations of the fourth aspect, the control module is configured to: if the first spread spectrum capability information indicates that the apparatus supports the spectrum spreading, and the second spread spectrum capability information indicates that the second apparatus supports the spectrum spreading, determine to enable the spectrum spreading of the second apparatus; or if the first spread spectrum capability information indicates that the apparatus does not support the spectrum spreading, and/or the second spread spectrum capability information indicates that the second apparatus does not support the spectrum spreading, determine not to enable the spectrum spreading of the second apparatus.

With reference to the fourth aspect, in some implementations of the fourth aspect, the receiving module is configured to receive, from a third apparatus, the first TSB sent by the second apparatus, where the first TSB further includes third spread spectrum capability information of the third apparatus. The sending module is configured to send the second TSB to the second apparatus via the third apparatus, where the second TSB further includes second indication information, and the second indication information indicates the third apparatus to enable or not to enable spectrum spreading.

With reference to the fourth aspect, in some implementations of the fourth aspect, the control module is further configured to determine, based on the first spread spectrum capability information, the second spread spectrum capability information, and the third spread spectrum capability information, whether to enable the spectrum spreading of the third apparatus and whether to enable the spectrum spreading of the second apparatus.

With reference to the fourth aspect, in some implementations of the fourth aspect, the sending module is further configured to send the third TSB to the second apparatus via the third apparatus, where the third TSB that arrives at the second apparatus includes the first spread spectrum capability information of the apparatus and the third spread spectrum capability information, and the third spread spectrum capability information includes at least one of a third spread spectrum frequency offset supported by the third apparatus or indication information indicating whether the third apparatus supports the spectrum spreading.

With reference to the fourth aspect, in some implementations of the fourth aspect, the control module is configured to: if the first spread spectrum capability information indicates that the apparatus supports the spectrum spreading, the second spread spectrum capability information indicates that the second apparatus supports the spectrum spreading, and the third spread spectrum capability information indicates that the third apparatus supports the spectrum spreading, determine to enable the spectrum spreading of the third apparatus and to enable the spectrum spreading of the second apparatus; or if the first spread spectrum capability information indicates that the apparatus does not support the spectrum spreading, the second spread spectrum capability information indicates that the second apparatus does not support the spectrum spreading, and/or the third spread spectrum capability information indicates that the third apparatus does not support the spectrum spreading, determine not to enable the spectrum spreading of the third apparatus and not to enable the spectrum spreading of the second apparatus.

With reference to the fourth aspect, in some implementations of the fourth aspect, the control module is configured to: if the first spread spectrum capability information indicates that the apparatus supports the spectrum spreading, the second spread spectrum capability information indicates that the second apparatus does not support the spectrum spreading, and the third spread spectrum capability information indicates that the third apparatus supports the spectrum spreading, determine to enable the spectrum spreading of the third apparatus and not to enable the spectrum spreading of the second apparatus; or if the first spread spectrum capability information indicates that the apparatus does not support the spectrum spreading, the second spread spectrum capability information indicates that the second apparatus supports the spectrum spreading, and the third spread spectrum capability information indicates that the third apparatus supports the spectrum spreading, determine to enable the spectrum spreading of the third apparatus and to enable the spectrum spreading of the second apparatus.

With reference to the fourth aspect, in some implementations of the fourth aspect, the TSB includes a type indication field, a payload field, and a CRC field, where the type indication field indicates that the TSB is a discovery TSB or a configuration TSB, the payload field is used to carry the spread spectrum capability information or the indication information indicating that the spectrum spreading is enabled or not enabled, and the CRC field is used to check the TSB.

With reference to the fourth aspect, in some implementations of the fourth aspect, when the TSB is the discovery TSB, a first bit in the payload field is used to carry the first spread spectrum capability information, a second bit in the payload field is used to carry the second spread spectrum capability information, and a third bit in the payload field is used to carry the third spread spectrum capability information; or when the TSB is the configuration TSB, a first bit in the payload field is used to carry the first indication information, and a second bit in the payload field is used to carry the second indication information.

According to a fifth aspect, a communication apparatus is provided. The apparatus may be the second apparatus according to the second aspect, and the apparatus includes: a sending module, configured to send a first TSB to a first apparatus, where the first TSB includes second spread spectrum capability information of the apparatus, and the second spread spectrum capability information is used by the first apparatus to determine whether to enable spectrum spreading of the apparatus; and a receiving module, configured to receive a second TSB sent by the first apparatus, where the second TSB includes first indication information, and the first indication information indicates the apparatus to enable or not to enable the spectrum spreading.

With reference to the fifth aspect, in some implementations of the fifth aspect, the receiving module is further configured to receive a third TSB sent by the first apparatus, where the third TSB includes first spread spectrum capability information of the first apparatus.

With reference to the fifth aspect, in some implementations of the fifth aspect, the first spread spectrum capability information includes at least one of a first spread spectrum frequency offset supported by the first apparatus or indication information indicating whether the first apparatus supports spectrum spreading. The second spread spectrum capability information includes at least one of a second spread spectrum frequency offset supported by the apparatus or indication information indicating whether the apparatus supports the spectrum spreading.

With reference to the fifth aspect, in some implementations of the fifth aspect, the sending module is configured to send the first TSB to the first apparatus via a third apparatus, where the first TSB that arrives at the first apparatus includes third spread spectrum capability information of the third apparatus and the second spread spectrum capability information, and the third spread spectrum capability information includes at least one of a third spread spectrum frequency offset supported by the third apparatus or indication information indicating whether the third apparatus supports spectrum spreading. The receiving module is configured to receive, from the third apparatus, the second TSB sent by the first apparatus, where the second TSB further includes second indication information, and the second indication information indicates the third apparatus to enable or not to enable the spectrum spreading.

With reference to the fifth aspect, in some implementations of the fifth aspect, the receiving module is further configured to receive, from the third apparatus, the third TSB sent by the first apparatus, where the third TSB includes the first spread spectrum capability information of the first apparatus and the third spread spectrum capability information.

According to a sixth aspect, a communication device is provided, including a processor and a memory. The memory is configured to store a computer program, and the processor is configured to execute the computer program stored in the memory, so that the communication device performs the method in any one of the foregoing aspects or the possible implementations of the any one of the foregoing aspects.

According to a seventh aspect, a communication device is provided, including an input/output (I/O) interface and a logic circuit. The I/O interface is configured to receive or output information. The logic circuit is configured to perform the method according to any one of the foregoing aspects or the possible implementations of any one of the foregoing aspects.

According to an eighth aspect, a communication system is provided, including: a first apparatus in the method according to the first aspect, a second apparatus in the method according to the second aspect, and a third apparatus in the method according to the third aspect.

According to a ninth aspect, a computer-readable storage medium is provided, where the computer-readable storage medium stores a computer program. When the computer program is run on a computer or a processor, the computer or the processor is enabled to perform the method in any one of the foregoing aspects or the possible implementations of any one of the foregoing aspects.

According to a tenth aspect, a computer program product including instructions is provided. When the instructions are executed by a computer, a communication apparatus is enabled to implement the method in any one of the foregoing aspects or the possible implementations of any one of the foregoing aspects.

DESCRIPTION OF EMBODIMENTS

Figure 1:
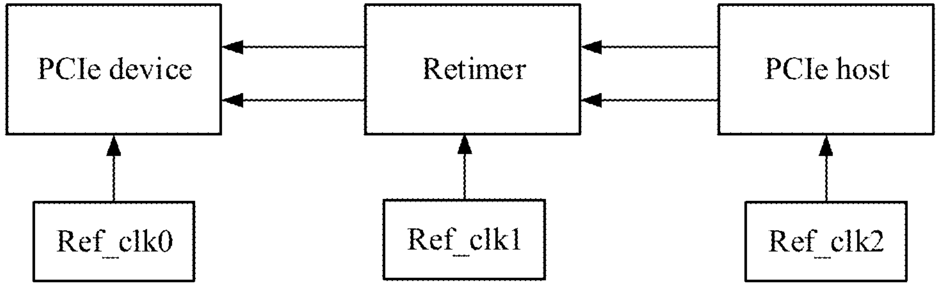
FIG. 1 is a diagram of a scenario in which a reference clock is used for a high-speed serial interface.

The following describes technical solutions of this disclosure with reference to accompanying drawings.

Embodiments of this disclosure may be applied to various communication systems, for example, a wireless local area network (WLAN) system, a Narrowband Internet of things (NB-IoT) system, a Global System for Mobile Communications (GSM), an Enhanced Data rates for GSM Evolution (EDGE) system, a wideband code-division multiple access (WCDMA) system, a code-division multiple access 2000 (CDMA2000) system, a time division-synchronous code division multiple access (TD-SCDMA) system, a Long-term Evolution (LTE) system, a satellite communication system, a 5th generation (5G) system, or a new communication system emerging in the future.

The communication system to which this disclosure is applicable includes one or more transmitters and one or more receivers. Signal transmission between the transmitter and the receiver may be performed over radio waves, or may be performed by using transmission media such as visible light, a laser, infrared light, and an optical fiber.

For example, one of the transmitter and the receiver may be a terminal device, and the other may be a network device. For example, both the transmitter and the receiver may be terminal devices.

The terminal device in embodiments of this disclosure may include various handheld devices, vehicle-mounted devices, wearable devices, or computing devices that have a wireless communication function, or other processing devices connected to a wireless modem. The terminal may be a mobile station (MS), a subscriber unit, user equipment (UE), a cellular phone, a smartphone, a wireless data card, a personal digital assistant (PDA) computer, a tablet computer, a wireless modem, a handset, a laptop computer, a machine type communication (MTC) terminal, or the like. The user equipment includes vehicle user equipment.

For example, the network device may be an evolved NodeB (eNB), a radio network controller (RNC), a NodeB (NB), a base station controller (BSC), a base transceiver station (BTS), a home base station (home evolved NodeB or home NodeB (HNB)), a baseband unit (BBU), an access point (AP) in a WI-FI system, a wireless relay node, a wireless backhaul node, or a transmission point (TP) or a transmission reception point (TRP). Alternatively, the network device may be a gNB or a transmission point (for example, a TRP or a TP) in new radio (NR), or one antenna panel or one group of antenna panels (including a plurality of antenna panels) of a base station in the NR. Alternatively, the network device may be a network node constituting a gNB or a transmission point, for example, a BBU or a distributed unit (DU). Alternatively, the network device may be a vehicle-mounted device, a wearable device, a network device in a 5G network, or a network device in a future evolved public land mobile network (PLMN). This is not limited.

The network device has abundant product forms. For example, in a product implementation process, the BBU and a radio frequency unit (RFU) may be integrated into a same device, and the device is connected to an antenna array through a cable (for example but not limited to a feeder). The BBU and the RFU may alternatively be disposed separately, are connected through an optical fiber, and communicate with each other by using, for example but not limited to a Common Public Radio Interface (CPRI) protocol. In this case, the RFU is usually referred to as a remote radio unit (RRU), and is connected to the antenna array through a cable. In addition, the RRU may alternatively be integrated with the antenna array. For example, this structure is used for an active antenna unit (AAU) product in a current market.

In addition, the BBU may be further divided into a plurality of parts. For example, the BBU may be further divided into a central unit (CU) and a DU based on real-time performance of a processed service. The CU is responsible for processing a non-real-time protocol and service, and the DU is responsible for processing a physical layer protocol and a real-time service. Further, some physical layer functions may be separated from the BBU or the DU and integrated into an AAU.

For ease of understanding of embodiments of this disclosure, a spread spectrum technology in embodiments of this disclosure is briefly described. The spread spectrum technology is a common wireless communication technology, and is briefly referred to as a spread spectrum technology. When a clock generator on a motherboard works, a peak value of a pulse produces electromagnetic interference, and the spread spectrum technology may be used to reduce the electromagnetic interference produced by a pulse generator. In embodiments of this disclosure, the spread spectrum is collectively referred to as spectrum spreading.

In a modern computer system, a peripheral component interconnect express is widely used as a key high-speed interconnection interface. A high-speed serial link on a PCB produces electromagnetic interference to other circuits due to a high frequency and concentrated spectra.

The spectrum spreading is a technology added by a PCIe physical layer to reduce electromagnetic interference produced by serializer/deserializer differential signals to other devices. After the SSC is enabled, a spread spectrum hardware module modulates a reference clock by using a low-frequency clock. Noise spectra of low-voltage differential signaling are less concentrated, to improve electromagnetic compatibility.

FIG. 1 is a diagram of a scenario in which a reference clock is used for a high-speed serial interface. A reference clock that meets a specification requirement needs to be provided for a PCIe outside a chip. Generally, a PCIe working in a host mode outputs a reference clock used by the PCIe. A retimer and a device may choose to use a reference clock output by a host, or may choose to use a reference clock provided by a local board.

A transmitter/sending apparatus may control a clock chip on the board to enable spectrum spreading and disable the spectrum spreading, or control an SSC generator built in a SerDes of the PCIe to enable spectrum spreading and disable the spectrum spreading. Enabling spectrum spreading may be understood as follows: a clock chip or an SSC generator modulates a reference clock by using a low-frequency clock, and a modulated reference clock is a reference clock transmitted after the spectrum spreading is enabled, to reduce electromagnetic interference produced by the reference clock. Disabling the spectrum spreading may be understood as follows: the clock chip or the SSC generator does not modulate the reference clock, in other words, does not perform any processing.

Whether a receiver (RX) supports spectrum spreading needs to be learned of before a transmitter (TX) enables spectrum spreading. However, a PCIe protocol does not define related bitstreams and software and hardware procedures to exchange spread spectrum capability information of the RX and the TX. As a result, currently, a product can rely on only software to learn of related information in advance and then replace firmware for adaptation, and dynamic negotiation cannot be performed. In addition, when there is a retimer on a high-speed serial link, it is impossible to learn of a supported spread spectrum frequency offset and indication information indicating whether the retimer supports spectrum spreading. This limits an application of spectrum spreading in the product.

In addition, the PCIe protocol allows a spread spectrum frequency offset to change within a specific range. If the TX keeps inserting a skip (SKP) based on a maximum frequency offset, link performance is affected. For example, if the SKP is inserted based on the maximum frequency offset amplitude, 2% performance is lost.

Currently, a system management bus (SM bus) may be added to the PCIe to collect a capability of supporting the SSC by each port in the link, and enabling/disabling of the SSC is determined based on capability information. However, in this solution, when there is a retimer in the link, the SSC cannot be independently enabled/disabled at both ends of the link. In other words, all apparatuses or devices in the link need to enable/disable the SSC together. In addition, the SM bus needs to be added to hardware to collect information about each port. This increases complexity and costs. In addition, a frequency at which an SKP is inserted in this solution cannot be adjusted.

Therefore, embodiments of this disclosure provide a spread spectrum control method. In this method, spread spectrum capability information of an apparatus in a wired high-speed serial link can be learned of by sending a TSB, and indication information can be sent to indicate the apparatus in the wired high-speed serial link to enable or not to enable spectrum spreading.

Figure 2:
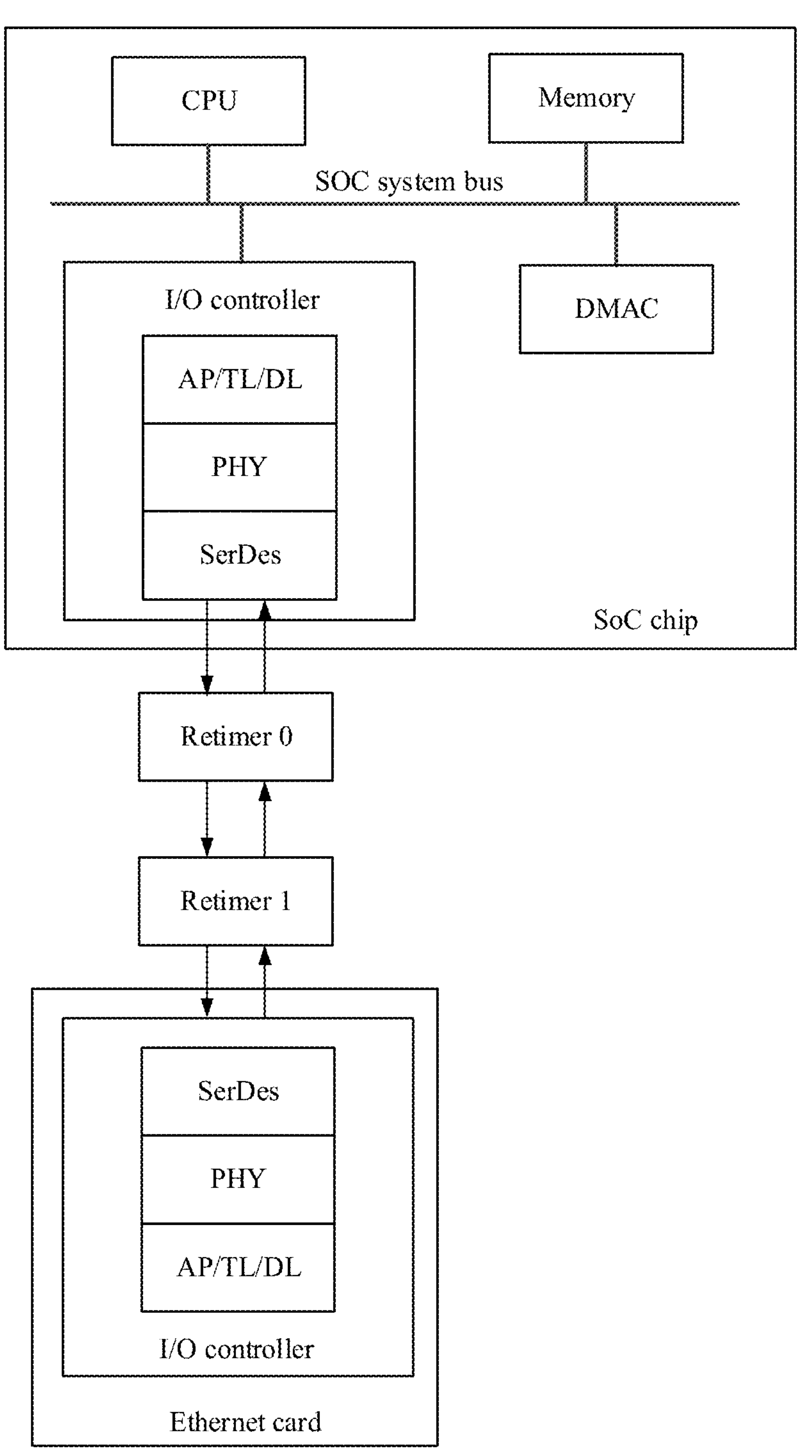
FIG. 2 shows an example of an application of a high-speed serial interface controller in a system on a chip (Soc).

FIG. 2 shows an example of an application of a high-speed serial interface controller (I/O controller) in a SoC. The SoC uses a wired high-speed serial interface to connect to an Ethernet network interface card (network card), and the SoC uses the Ethernet network interface card to communicate with an external network. Two retimers are connected in series between the SoC and the Ethernet network interface card, including a retimer 0 and a retimer 1. The retimer is used to relay data transmitted between the SoC and the Ethernet network interface card.

The high-speed serial interface controller is integrated in the SoC, and is connected to a system bus of the SoC. Chipset components such as a central processing unit (CPU), a direct memory access controller (DMAC), and a memory are further connected to the system bus. A physical layer (PHY) is a part of the high-speed serial interface controller. The high-speed serial interface controller is connected to an external Ethernet network interface card device via a SerDes, to constitute a chip system that has a high-speed I/O interface and a retimer.

For ease of understanding of embodiments of this disclosure, a TSB in embodiments of this disclosure is briefly described. The TSB includes a discovery TSB (DTSB), a configuration TSB (CTSB), an equalization TSB (ETSB), a retrain TSB (RTSB), a unified TSB (UTSB), and the like.

Figure 3:
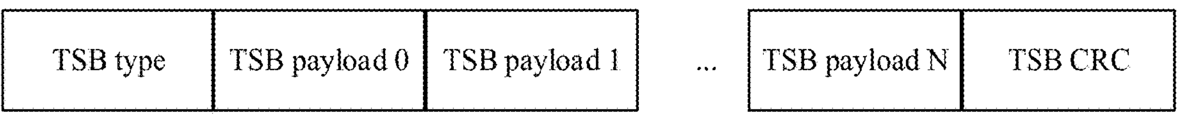
FIG. 3 is a diagram of a data structure of a TSB according to an embodiment of this disclosure.

The TSB is sent by a transmitter or a receiver in a process of establishing a high-speed serial link, and the TSB carries some information required for establishing the high-speed serial link. FIG. 3 is a diagram of a data structure of a TSB according to an embodiment of this disclosure. The TSB includes: (1) a TSB type indication field indicating a status of a negotiation process. For example, "0xA0" indicates a discovery state, and indicates that the TSB is a DTSB. "0xB0" indicates a configuration state, and indicates that the TSB is a CTSB. "other" indicates a reserved field; (2) a TSB payload field that carries negotiation-related information and whose length may be any value, for example, carries indication information indicating whether to enable or not to enable spectrum spreading and at least one of a supported spread spectrum frequency offset or indication information indicating whether an apparatus in a wired high-speed serial link supports spectrum spreading; and (3) a TSB CRC field for checking and confirming correctness of the entire TSB, to ensure that negotiation information is transmitted correctly when there is a bit error.

Figure 4:
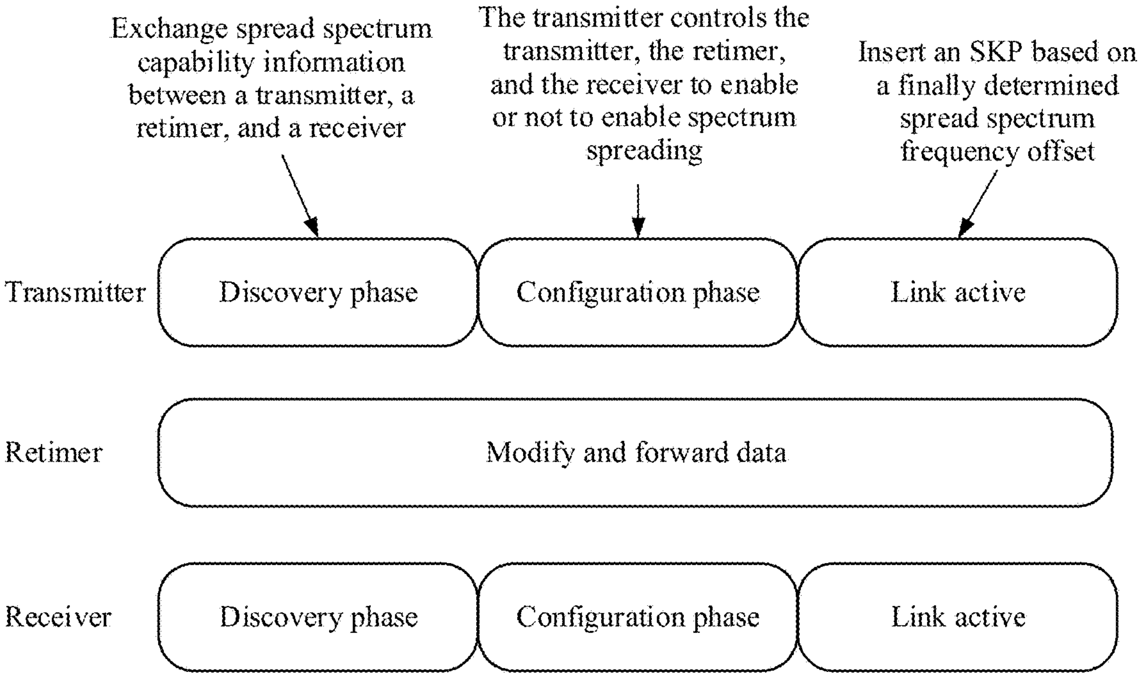
FIG. 4 is a diagram of a negotiation procedure according to an embodiment of this disclosure.

In embodiments of this disclosure, a procedure of negotiating whether to enable spectrum spreading includes a discovery phase, a configuration phase, and a link active/service interaction phase. FIG. 4 is a diagram of a negotiation procedure according to an embodiment of this disclosure.

Discovery phase: A transmitter and a receiver exchange, by using DTSBs, indication information indicating whether spectrum spreading is supported or supported spread spectrum frequency offsets. In this phase, the transmitter may send a DTSB, where the DTSB includes at least one of a supported spread spectrum frequency offset or indication information indicating whether the transmitter supports spectrum spreading. When forwarding the DTSB, a retimer modifies a related field segment in the DTSB based on at least one of a supported spread spectrum frequency offset or indication information indicating whether the receiver supports spectrum spreading, to notify the receiver of at least one of a status of supporting spectrum spreading or the supported spread spectrum frequency offset. The receiver may also send a DTSB, where the DTSB includes at least one of a supported spread spectrum frequency offset or indication information indicating whether the receiver supports spectrum spreading. When forwarding the DTSB, the retimer also modifies a related field segment in the DTSB based on at least one of the supported spread spectrum frequency offset or the indication information indicating whether the retimer supports spectrum spreading, to notify the transmitter of a status of supporting spectrum spreading or the supported spread spectrum frequency offset.

Configuration phase: CTSBs are used to perform handshake confirmation about whether to enable or not to enable spectrum spreading. In this phase, the transmitter parses the DTSB sent by the receiver to obtain the spread spectrum frequency offset and the indication information indicating whether the retimer supports spectrum spreading, and determines whether to enable spectrum spreading of each retimer. The transmitter sends a CTSB to the receiver, and a confirmation result is reflected in the sent CTSB. At the same time, the transmitter calculates a frequency at which an SKP is inserted based on a finally determined spread spectrum frequency offset.

Link active/service interaction phase: After receiving the CTSB, the receiver enters a service data sending and receiving phase. To be specific, after negotiation of enabling or not enabling spectrum spreading, a normal service interaction phase is entered, and an SKP is inserted periodically based on the calculated insertion frequency.

In embodiments of this disclosure, a first apparatus may be an I/O controller in a SoC, a second apparatus may be an Ethernet network interface card, and a third apparatus may be a retimer. The first apparatus may be referred to as a transmitter, the second apparatus may be referred to as a receiver, and the third apparatus may be referred to as a relay apparatus. This is not limited.

Figure 5:
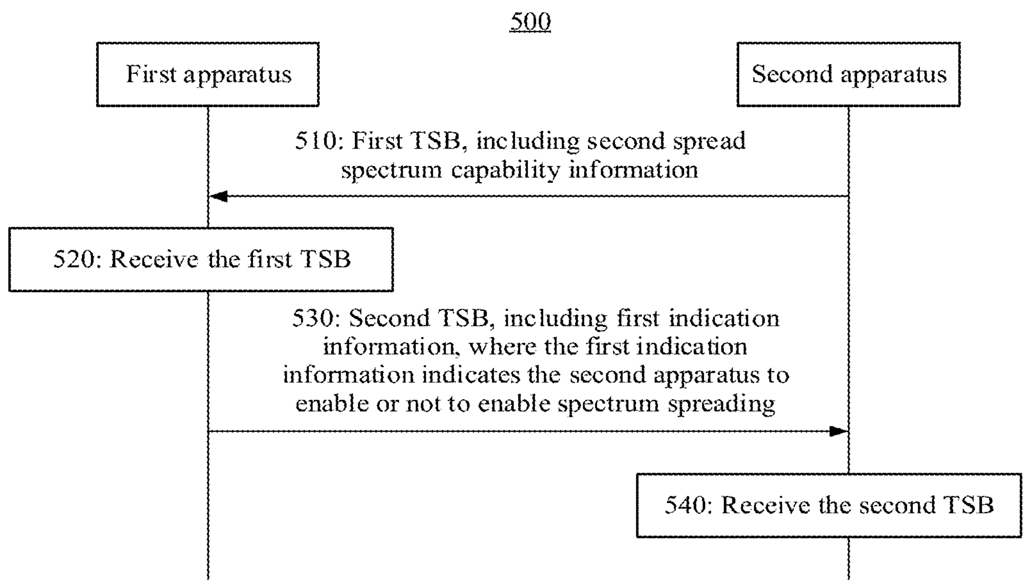
FIG. 5 is a schematic interaction flowchart of a spread spectrum control method according to an embodiment of this disclosure.

FIG. 5 is a schematic interaction flowchart of a spread spectrum control method 500 according to an embodiment of this disclosure. The method is applicable to a wired high-speed serial link, to obtain spread spectrum capability information of an apparatus in the wired high-speed serial link, so as to determine and indicate whether to enable spectrum spreading.

In this embodiment of this disclosure, an example in which the wired high-speed serial link includes a first apparatus and a second apparatus is used. The method includes the following steps.

510: The second apparatus sends a first TSB to the first apparatus, where the first TSB includes second spread spectrum capability information of the second apparatus, and the second spread spectrum capability information is used by the first apparatus to determine whether to enable spectrum spreading of the second apparatus.

Enabling spectrum spreading includes modulating, by a clock chip or a spread spectrum generator, a reference clock by using a low-frequency clock. Not enabling the spectrum spreading includes skipping modulating the reference clock by the clock chip or the spread spectrum generator.

Optionally, the second spread spectrum capability information includes at least one of a second spread spectrum frequency offset supported by the second apparatus or indication information indicating whether the second apparatus supports the spectrum spreading. For example, the second spread spectrum capability information may include only the indication information indicating whether the second apparatus supports the spectrum spreading. For example, the second spread spectrum capability information may include only indication information indicating that the second apparatus does not support the spectrum spreading. The second spread spectrum capability information may include only the second spread spectrum frequency offset supported by the second apparatus. It should be understood that, when the second spread spectrum capability information includes only the second spread spectrum frequency offset supported by the second apparatus, whether the second spread spectrum frequency offset is greater than or equal to a protocol-specified frequency offset threshold may be determined based on the frequency offset threshold. If the second spread spectrum frequency offset is greater than or equal to the frequency offset threshold, it is determined that the second apparatus supports the spectrum spreading. If the second spread spectrum frequency offset is less than the frequency offset threshold, it is determined that the second apparatus does not support the spectrum spreading. The second spread spectrum capability information may include the indication information indicating whether the second apparatus supports the spectrum spreading and the second spread spectrum frequency offset supported by the second apparatus. It should be understood that, when the second apparatus does not support the spectrum spreading, the second spread spectrum capability information does not include the second spread spectrum frequency offset supported by the second apparatus.

520: The first apparatus receives the first TSB sent by the second apparatus.

530: The first apparatus sends a second TSB to the second apparatus, where the second TSB includes first indication information, and the first indication information indicates the second apparatus to enable or not to enable the spectrum spreading.

The first apparatus determines, based on first spread spectrum capability information of the first apparatus and the second spread spectrum capability information of the second apparatus, whether to enable the spectrum spreading of the second apparatus. If the first apparatus determines to enable the spectrum spreading of the second apparatus, the first indication information indicates the second apparatus to enable the spectrum spreading. If the first apparatus determines not to enable the spectrum spreading of the second apparatus, the first indication information indicates the second apparatus not to enable the spectrum spreading. Optionally, the first spread spectrum capability information includes at least one of a first spread spectrum frequency offset supported by the first apparatus or indication information indicating whether the first apparatus supports spectrum spreading.

For example, if the first spread spectrum capability information indicates that the first apparatus supports the spectrum spreading, and the second spread spectrum capability information indicates that the second apparatus supports the spectrum spreading, the first apparatus determines to enable the spectrum spreading of the second apparatus. If the first spread spectrum capability information indicates that the first apparatus does not support the spectrum spreading, and/or the second spread spectrum capability information indicates that the second apparatus does not support the spectrum spreading, the first apparatus determines not to enable the spectrum spreading of the second apparatus. In other words, the first apparatus determines to enable the spectrum spreading of the second apparatus only when both the first apparatus and the second apparatus support the spectrum spreading. It should be understood that, when both the first apparatus and the second apparatus support the spectrum spreading, the first apparatus also enables the spectrum spreading of the first apparatus when determining to enable the spectrum spreading of the second apparatus. In this case, the first apparatus may first send the second TSB to the second apparatus and then enable the spectrum spreading of the first apparatus. Alternatively, the first apparatus may first enable the spectrum spreading of the first apparatus and then send the second TSB to the second apparatus. This is not limited. When either of the first apparatus and the second apparatus does not support the spectrum spreading or neither of the first apparatus nor the second apparatus supports the spectrum spreading, the first apparatus determines not to enable the spectrum spreading of the second apparatus or not to enable the spectrum spreading of the first apparatus.

It may be understood that if the first spread spectrum capability information indicates that the first apparatus does not support the spectrum spreading, and/or the second spread spectrum capability information indicates that the second apparatus does not support the spectrum spreading, the first apparatus determines not to enable the spectrum spreading of the second apparatus. In other words, when either of the first apparatus and the second apparatus does not support the spectrum spreading, the first apparatus determines not to enable the spectrum spreading of the second apparatus.

If the first apparatus determines to enable the spectrum spreading of the second apparatus, the first apparatus determines a first target spread spectrum frequency offset based on the first spread spectrum frequency offset supported by the first apparatus and the second spread spectrum frequency offset supported by the second apparatus. For example, when the first spread spectrum frequency offset is greater than or equal to the second spread spectrum frequency offset, the first apparatus may determine that the first target spread spectrum frequency offset is equal to the first spread spectrum frequency offset. When the first spread spectrum frequency offset is less than the second spread spectrum frequency offset, the first apparatus may determine that the first target spread spectrum frequency offset is equal to the second spread spectrum frequency offset. In this case, the first indication information in the second TSB sent by the first apparatus to the second apparatus may carry the first target spread spectrum frequency offset, and the first indication information indicates the second apparatus to enable the spectrum spreading based on the first target spread spectrum frequency offset. Correspondingly, the second apparatus may determine, based on the first target spread spectrum frequency offset, a frequency at which an SKP is inserted.

If the first apparatus determines not to enable the spectrum spreading of the second apparatus, the first indication information in the second TSB sent by the first apparatus to the second apparatus does not carry the first target spread spectrum frequency offset, and the second TSB is used to indicate the second apparatus not to enable the spectrum spreading.

540: The second apparatus receives the second TSB sent by the first apparatus, and enables or does not enable the spectrum spreading of the second apparatus based on the first indication information in the second TSB. If the first indication information indicates to enable the spectrum spreading of the second apparatus, the second apparatus enables the spectrum spreading of the second apparatus. If the first indication information indicates not to enable the spectrum spreading of the second apparatus, the second apparatus does not enable the spectrum spreading of the second apparatus.

Optionally, when the second apparatus sends the first TSB to the first apparatus, the first apparatus may also send a third TSB to the second apparatus, where the third TSB includes the first spread spectrum capability information of the first apparatus. Alternatively, the first apparatus first sends the third TSB to the second apparatus, and after the second apparatus receives the third TSB sent by the first apparatus, the second apparatus sends the first TSB to the first apparatus. This is not limited.

It should be understood that, when the first apparatus also sends the first spread spectrum capability information to the second apparatus, and the first spread spectrum capability information includes the first spread spectrum frequency offset supported by the first apparatus, the first indication information in the second TSB sent by the first apparatus to the second apparatus may not carry the first target spread spectrum frequency offset, because the second apparatus may also determine the first target spread spectrum frequency offset based on the first spread spectrum frequency offset supported by the first apparatus and the second spread spectrum frequency offset supported by the second apparatus. The first indication information in the second TSB sent by the first apparatus to the second apparatus may alternatively carry the first target spread spectrum frequency offset. When the first apparatus does not send the first spread spectrum capability information to the second apparatus, the first indication information in the second TSB sent by the first apparatus to the second apparatus needs to carry the first target spread spectrum frequency offset.

In the technical solution provided in this embodiment of this disclosure, the second apparatus may send the second spread spectrum capability information of the second apparatus to the first apparatus, and the first apparatus receives the second spread spectrum capability information sent by the second apparatus, that is, the spread spectrum capability information may be exchanged between the first apparatus and the second apparatus. The first apparatus may determine, based on the second spread spectrum capability information and the first spread spectrum capability information of the first apparatus, whether to enable the spectrum spreading of the second apparatus and the spectrum spreading of the first apparatus. The first apparatus may send the first indication information to the second apparatus, where the first indication information indicates the second apparatus to enable or not to enable the spectrum spreading. In other technologies, a software developer can learn of, in advance only based on information such as a hardware interconnection form of an apparatus, whether the apparatus in a wired high-speed serial link supports spectrum spreading, and this process is complicated. After learning of in advance the related information about whether the spectrum spreading is supported, the software developer needs to develop software for controlling spectrum spreading enabling/disabling. Because hardware interconnection forms in different products are diverse and connected components come from different vendors, software development costs are high and maintenance workload is heavy. Compared with a method of learning of, in advance based on the hardware interconnection form of the apparatus, whether the apparatus in the wired high-speed serial link supports the spectrum spreading and developing the software for controlling spectrum spreading enabling/disabling, a method for determining and indicating, by exchanging spread spectrum capability information between different apparatuses in this solution, whether to enable spectrum spreading, is more convenient and more efficient. Therefore, according to the spread spectrum control method provided in this disclosure, spread spectrum capability information of the apparatus in the wired high-speed serial link can be learned of, so that whether to enable the spectrum spreading can be determined and indicated.

Figure 6:
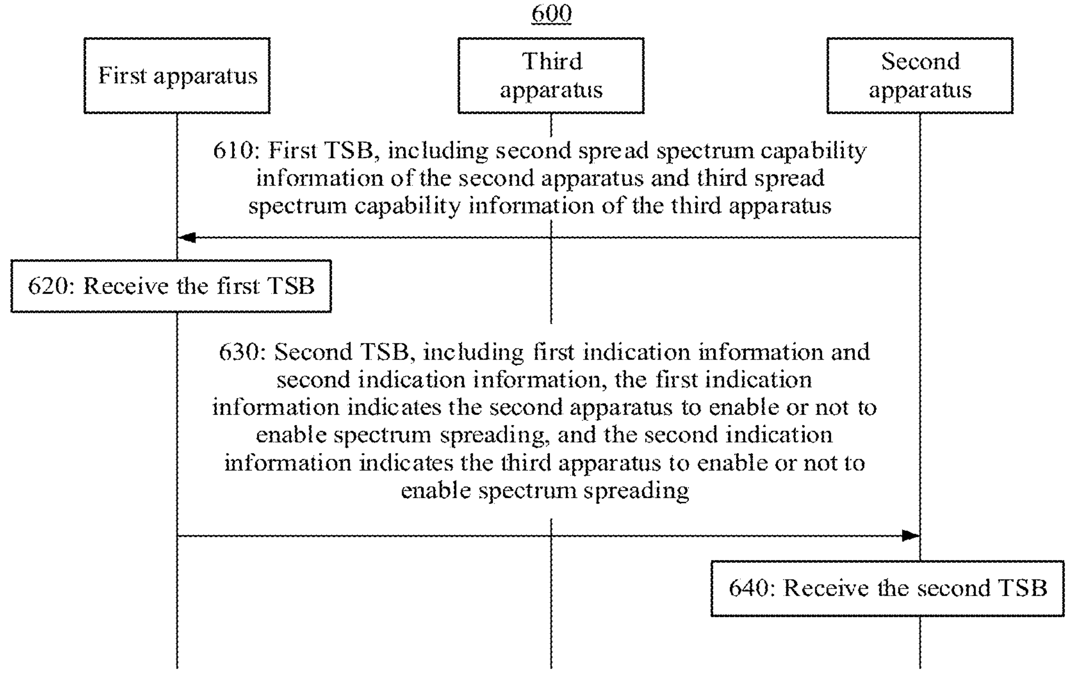
FIG. 6 is a schematic interaction flowchart of another spread spectrum control method according to an embodiment of this disclosure.

FIG. 6 is a schematic interaction flowchart of a spread spectrum control method 600 according to an embodiment of this disclosure. The method is applicable to a wired high-speed serial link, to learn of spread spectrum capability information of an apparatus in the wired high-speed serial link through interaction, and determine, based on an indication, whether to enable spectrum spreading.

In this embodiment of this disclosure, an example in which the wired high-speed serial link includes a first apparatus, a second apparatus, and a third apparatus is used. The method includes the following steps.

610: The second apparatus sends a first TSB to the first apparatus via the third apparatus, where the first TSB that arrives at the first apparatus includes second spread spectrum capability information of the second apparatus and third spread spectrum capability information of the third apparatus. The second spread spectrum capability information includes at least one of a second spread spectrum frequency offset supported by the second apparatus or indication information indicating whether the second apparatus supports spectrum spreading. The third spread spectrum capability information includes at least one of a third spread spectrum frequency offset supported by the third apparatus or indication information indicating whether the third apparatus supports spectrum spreading.

The second apparatus sends the first TSB to the third apparatus, where the first TSB includes the second spread spectrum capability information of the second apparatus. Correspondingly, the third apparatus receives the first TSB sent by the second apparatus, and the third apparatus updates the first TSB. An updated first TSB includes the second spread spectrum capability information of the second apparatus and the third spread spectrum capability information of the third apparatus. In other words, the third apparatus adds, to the first TSB, at least one of the supported third spread spectrum frequency offset or the indication information indicating whether the third apparatus supports the spectrum spreading. The third apparatus sends the updated first TSB to the first apparatus.

Enabling spectrum spreading includes modulating, by a clock chip or a spread spectrum generator, a reference clock by using a low-frequency clock. Not enabling the spectrum spreading includes skipping modulating the reference clock by the clock chip or the spread spectrum generator.

620: The first apparatus receives, from the third apparatus, the first TSB sent by the second apparatus, where the first TSB that arrives at the first apparatus is the updated first TSB of the third apparatus. In other words, the first TSB received by the first apparatus includes the second spread spectrum capability information of the second apparatus and the third spread spectrum capability information of the third apparatus.

630: The first apparatus sends a second TSB to the second apparatus via the third apparatus, where the second TSB includes first indication information and second indication information, the first indication information indicates the second apparatus to enable or not to enable the spectrum spreading, and the second indication information indicates the third apparatus to enable or not to enable the spectrum spreading.

The first apparatus determines, based on first spread spectrum capability information of the first apparatus, the second spread spectrum capability information of the second apparatus, and the third spread spectrum capability information of the third apparatus, whether to enable the spectrum spreading of the third apparatus and whether to enable the spectrum spreading of the second apparatus. If the first apparatus determines to enable the spectrum spreading of the third apparatus, the second indication information indicates the third apparatus to enable the spectrum spreading. If the first apparatus determines not to enable the spectrum spreading of the third apparatus, the second indication information indicates the third apparatus not to enable the spectrum spreading. If the first apparatus determines to enable the spectrum spreading of the second apparatus, the first indication information indicates the second apparatus to enable the spectrum spreading. If the first apparatus determines not to enable the spectrum spreading of the second apparatus, the first indication information indicates the second apparatus not to enable the spectrum spreading. Optionally, the first spread spectrum capability information includes at least one of a first spread spectrum frequency offset supported by the first apparatus or indication information indicating whether the first apparatus supports spectrum spreading.

For example, if the first spread spectrum capability information indicates that the first apparatus supports the spectrum spreading, the second spread spectrum capability information indicates that the second apparatus supports the spectrum spreading, and the third spread spectrum capability information indicates that the third apparatus supports the spectrum spreading, the first apparatus determines to enable the spectrum spreading of the third apparatus and to enable the spectrum spreading of the second apparatus. If the first spread spectrum capability information indicates that the first apparatus does not support the spectrum spreading, the second spread spectrum capability information indicates that the second apparatus does not support the spectrum spreading, and/or the third spread spectrum capability information indicates that the third apparatus does not support the spectrum spreading, the first apparatus determines not to enable the spectrum spreading of the third apparatus and not to enable the spectrum spreading of the second apparatus. It should be understood that, when the first apparatus determines to enable the spectrum spreading of the third apparatus, the first apparatus also determines to enable the spectrum spreading of the first apparatus. When the first apparatus determines not to enable the spectrum spreading of the third apparatus, the first apparatus also determines not to enable the spectrum spreading of the first apparatus.

It may be understood that if the first spread spectrum capability information indicates that the first apparatus does not support the spectrum spreading, and/or the third spread spectrum capability information indicates that the third apparatus does not support the spectrum spreading, and/or the second spread spectrum capability information indicates that the second apparatus does not support the spectrum spreading, the first apparatus determines not to enable the spectrum spreading of the second apparatus. In other words, when any one of the first apparatus, the third apparatus, and the second apparatus does not support the spectrum spreading, the first apparatus determines not to enable the spectrum spreading of the third apparatus and not to enable the spectrum spreading of the second apparatus.

Optionally, if the first apparatus determines to enable the spectrum spreading of the third apparatus and to enable the spectrum spreading of the second apparatus, the first apparatus determines, based on the first spread spectrum frequency offset supported by the first apparatus, the third spread spectrum frequency offset supported by the third apparatus, and the second spread spectrum frequency offset supported by the second apparatus, a second target spread spectrum frequency offset. For example, the second target spread spectrum frequency offset is equal to a maximum spread spectrum frequency offset in the first spread spectrum frequency offset, the second spread spectrum frequency offset, and the third spread spectrum frequency offset. In this case, each of the first indication information and the second indication information in the second TSB may carry the second target spread spectrum frequency offset. The first indication information indicates the second apparatus to enable the spectrum spreading based on the second target spread spectrum frequency offset, and the second indication information indicates the third apparatus to enable the spectrum spreading based on the second target spread spectrum frequency offset.

If the first apparatus determines not to enable the spectrum spreading of the second apparatus and not to enable the spectrum spreading of the third apparatus, neither the first indication information nor the second indication information in the second TSB carries the second target spread spectrum frequency offset. The second TSB is used to indicate the second apparatus not to enable the spectrum spreading, and the third apparatus not to enable the spectrum spreading.

For example, if the first spread spectrum capability information indicates that the first apparatus supports the spectrum spreading, the second spread spectrum capability information indicates that the second apparatus does not support the spectrum spreading, and the third spread spectrum capability information indicates that the third apparatus supports the spectrum spreading, the first apparatus determines to enable the spectrum spreading of the third apparatus and not to enable the spectrum spreading of the second apparatus. In other words, the first apparatus determines to enable spectrum spreading of a link between the first apparatus and the third apparatus and not to enable spectrum spreading between the third apparatus and the second apparatus. It should be understood that, if the first apparatus determines to enable the spectrum spreading of the third apparatus, the first apparatus also determines to enable the spectrum spreading of the first apparatus. In this case, the first indication information in the second TSB indicates the second apparatus not to enable the spectrum spreading, and the second indication information in the second TSB indicates the third apparatus to enable the spectrum spreading. Optionally, the second indication information may further carry a third target spread spectrum frequency offset, and the second indication information indicates the third apparatus to enable the spectrum spreading based on the third target spread spectrum frequency offset. The third target spread spectrum frequency offset may be equal to a maximum spread spectrum frequency offset in the first spread spectrum frequency offset and the third spread spectrum frequency offset.

For example, if the first spread spectrum capability information indicates that the first apparatus does not support the spectrum spreading, the second spread spectrum capability information indicates that the second apparatus supports the spectrum spreading, and the third spread spectrum capability information indicates that the third apparatus supports the spectrum spreading, the first apparatus determines to enable the spectrum spreading of the third apparatus and to enable the spectrum spreading of the second apparatus. However, the first apparatus determines not to enable the spectrum spreading of the first apparatus. In other words, the first apparatus determines to enable the spectrum spreading between the third apparatus and the second apparatus, and not to enable the spectrum spreading between the first apparatus and the third apparatus. In this case, the first indication information in the second TSB indicates the second apparatus to enable the spectrum spreading, and the second indication information in the second TSB indicates the third apparatus to enable the spectrum spreading. Optionally, the first indication information and the second indication information may further carry a fourth target spread spectrum frequency offset. The first indication information indicates the second apparatus to enable the spectrum spreading based on the fourth target spread spectrum frequency offset, and the second indication information indicates the third apparatus to enable the spectrum spreading based on the fourth target spread spectrum frequency offset. The fourth target spread spectrum frequency offset may be equal to a maximum spread spectrum frequency offset in the second spread spectrum frequency offset and the third spread spectrum frequency offset.

640: The second apparatus receives, from the third apparatus, the second TSB sent by the first apparatus, and enables or does not enable the spectrum spreading of the second apparatus based on the first indication information in the second TSB. If the first indication information indicates to enable the spectrum spreading of the second apparatus, the second apparatus enables the spectrum spreading of the second apparatus. If the first indication information indicates not to enable the spectrum spreading of the second apparatus, the second apparatus does not enable the spectrum spreading of the second apparatus.

The third apparatus receives the second TSB from the first apparatus, sends the second TSB to the second apparatus, and enables or does not enable the spectrum spreading of the third apparatus based on the second indication information in the second TSB. If the second indication information indicates to enable the spectrum spreading of the third apparatus, the third apparatus enables the spectrum spreading of the third apparatus. If the second indication information indicates not to enable the spectrum spreading of the third apparatus, the third apparatus does not enable the spectrum spreading of the third apparatus.

Optionally, when the second apparatus sends the first TSB to the first apparatus via the third apparatus, the first apparatus may also send a third TSB to the second apparatus via the third apparatus. The third TSB that arrives at the second apparatus includes the first spread spectrum capability information of the first apparatus and the third spread spectrum capability information of the third apparatus. Alternatively, the first apparatus first sends the third TSB to the second apparatus via the third apparatus, and after the second apparatus receives the third TSB from the third apparatus, the second apparatus sends the first TSB to the first apparatus via the third apparatus. This is not limited.

That the first apparatus sends the third TSB to the second apparatus via the third apparatus may be understood as follows: the first apparatus sends the third TSB to the third apparatus, where the third TSB includes the first spread spectrum capability information of the first apparatus. Correspondingly, the third apparatus receives the third TSB sent by the first apparatus, and the third apparatus updates the third TSB. An updated third TSB includes the first spread spectrum capability information of the first apparatus and the third spread spectrum capability information of the third apparatus. In other words, the third apparatus adds, to the third TSB, at least one of the supported third spread spectrum frequency offset or the indication information indicating whether the third apparatus supports the spectrum spreading. The third apparatus sends the updated third TSB to the second apparatus.

In the technical solution provided in this embodiment of this disclosure, the second apparatus sends the first TSB to the first apparatus via the third apparatus, where the first TSB that arrives at the first apparatus includes the second spread spectrum capability information of the second apparatus and the third spread spectrum capability information of the third apparatus. The first apparatus may determine, based on the second spread spectrum capability information, the third spread spectrum capability information, and the first spread spectrum capability information of the first apparatus, whether to enable the spectrum spreading of the second apparatus, whether to enable the spectrum spreading of the third apparatus, and whether to enable the spectrum spreading of the first apparatus. The first apparatus sends the second TSB to the second apparatus via the third apparatus, where the second TSB includes the first indication information and the second indication information, the first indication information indicates the second apparatus to enable or not to enable the spectrum spreading, and the second indication information indicates the third apparatus to enable or not to enable the spectrum spreading. Therefore, in the method, the spread spectrum capability information of the apparatus in the wired high-speed serial link can be learned of through interaction, and whether to enable the spectrum spreading can be determined based on the indication.

For example, the first TSB includes a first type indication field, a payload field, and a CRC field. The first type indication field indicates that the first TSB is a discovery TSB. The payload field in the first TSB is used to carry the spread spectrum capability information, and includes the second spread spectrum capability information of the second apparatus. The CRC field in the first TSB is used to check the first TSB.

For example, the second TSB includes a second type indication field, a payload field, and a CRC field. The second type indication field indicates that the second TSB is a configuration TSB. The payload field in the second TSB is used to carry the indication information indicating that the spectrum spreading is enabled or not enabled, and includes the indication information indicating the second apparatus to enable or not to enable the spectrum spreading. The CRC field in the second TSB is used to check the second TSB.

For example, the third TSB includes a third type indication field, a payload field, and a CRC field. The third type indication field indicates that the third TSB is a discovery TSB. The payload field in the third TSB is used to carry the spread spectrum capability information, and includes the first spread spectrum capability information of the first apparatus. The CRC field in the third TSB is used to check the third TSB.

The first TSB and the third TSB are the DTSBs, and the second TSB is the CTSB. For example, a first bit in the payload field in the DTSB is used to carry the first spread spectrum capability information, a second bit in the payload field is used to carry the second spread spectrum capability information, and a third bit in the payload field is used to carry the third spread spectrum capability information. For example, a first bit in the CTSB is used to carry the first indication information, and a second bit in the payload field is used to carry the second indication information.

It should be understood that there may be one or more third apparatuses in this embodiment of this disclosure. When there are a plurality of third apparatuses, the first TSB that arrives at the first apparatus includes spread spectrum capability information of the plurality of third apparatuses, and the third TSB that arrives at the second apparatus also includes the spread spectrum capability information of the plurality of third apparatuses. For example, there may be two third apparatuses, including a retimer 0 and a retimer 1.

Figure 7:
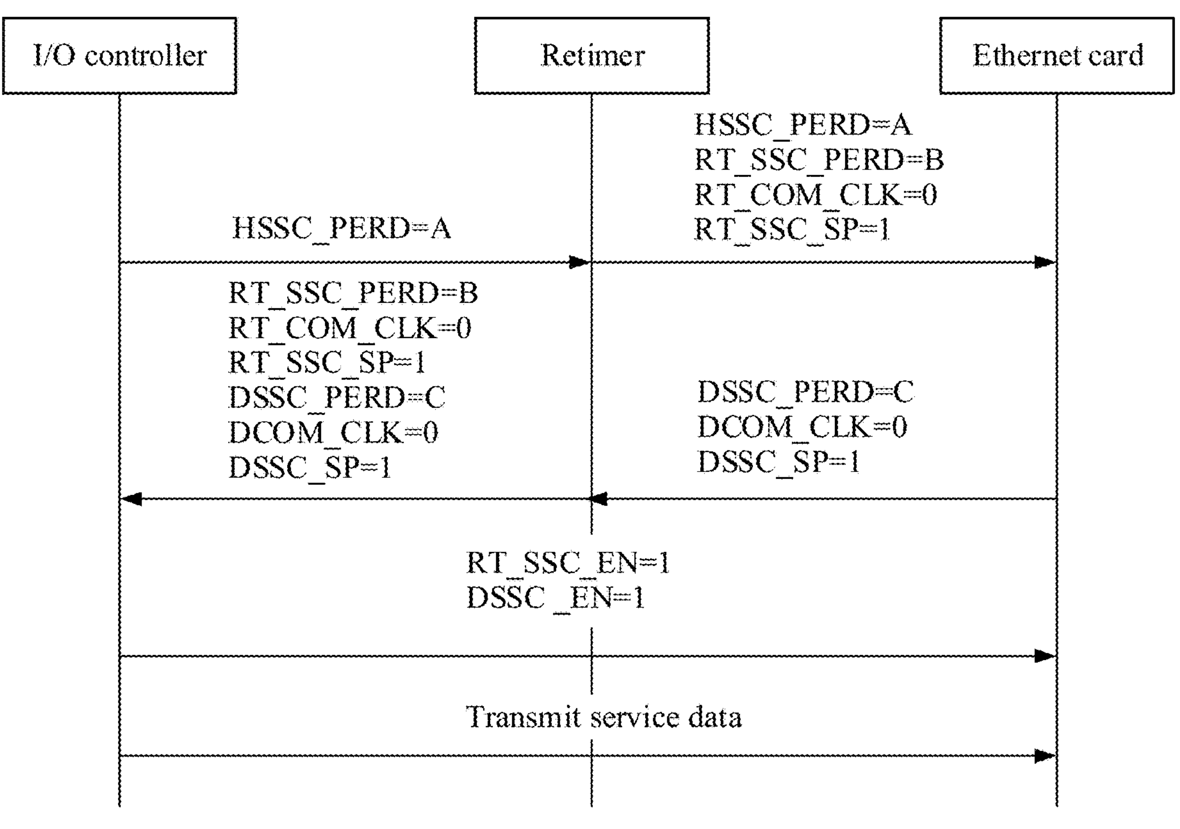
FIG. 7 shows an example of a spread spectrum control method according to an embodiment of this disclosure.

FIG. 7 shows an example of a spread spectrum control method according to an embodiment of this disclosure. An example in which a first apparatus is an I/O controller in a SoC, a second apparatus is an Ethernet network interface card, and a third apparatus is a retimer is used.

Step 1: The I/O controller sends a third DTSB to the Ethernet network interface card via the retimer.

The third DTSB sent by the I/O controller to the retimer includes first spread spectrum capability information supported by the I/O controller. For example, "HSSC_PERD=A" indicates a first spread spectrum frequency offset supported by the I/O controller.

The retimer receives and updates the third DTSB sent by the I/O controller, and adds, to the third DTSB, third spread spectrum capability information supported by the retimer. For example, "RT_SSC_PERD=B" indicates a third spread spectrum frequency offset supported by the retimer, and "RT_COM_CLK=0" and "RT_SSC_SP=1" indicate indication information indicating that the retimer supports spectrum spreading.

The retimer sends an updated third DTSB to the Ethernet network interface card, where the updated third DTSB includes "HSSC_PERD=A", "RT_SSC_PERD=B", "RT_COM_CLK=0", and "RT_SSC_SP=1"

Step 2: The Ethernet network interface card sends a first DTSB to the I/O controller via the retimer.

The first DTSB sent by the Ethernet network interface card to the retimer includes second spread spectrum capability information supported by the Ethernet network interface card. For example, "DSSC_PERD=C" indicates a second spread spectrum frequency offset supported by the Ethernet network interface card. "DCOM_CLK=0" and "DSSC_SP=1" indicate indication information indicating that the Ethernet network interface card supports spectrum spreading.

The retimer receives and updates the first DTSB sent by the Ethernet network interface card, and adds, to the first DTSB, the third spread spectrum capability information supported by the retimer. For example, "RT_SSC_PERD=B" indicates the third spread spectrum frequency offset supported by the retimer, and "RT_COM_CLK=0" and "RT_SSC_SP=1" indicate the indication information indicating that the retimer supports the spectrum spreading.

The retimer sends an updated first DTSB to the I/O controller, where the updated first DTSB includes "RT_SSC_PERD=B", "RT_COM_CLK=0", "RT_SSC_SP=1", "DSSC_PERD=C", "DCOM_CLK=0", and "DSSC_SP=1". Step 1 and step 2 are a spread spectrum capability information exchange phase, namely, the discovery phase described in FIG. 4.

Step 3: The I/O controller determines to enable the spectrum spreading of the retimer and the spectrum spreading of the Ethernet network interface card, and sends a second CTSB to the Ethernet network interface card via the retimer. For example, the second CTSB includes fields "RT_SSC_EN=1" and "DSSC_EN=1", where "RT_SSC_EN=1" indicates the retimer to enable the spectrum spreading, and "DSSC_EN=1" indicates the Ethernet network interface card to enable the spectrum spreading.

If the I/O controller determines to enable the spectrum spreading of the retimer and the spectrum spreading of the Ethernet network interface card, the I/O controller compares HSSC_PERD, DSSC_PERD, and RT_SSC_PERD, and selects a maximum value as a target spread spectrum frequency offset. The frequency offset is inserted into an SKP.

If the retimer receives "RT_SSC_EN=1" in the second CTSB, the retimer enables the spectrum spreading of the retimer. If the Ethernet network interface card receives "DSSC_EN=1" in the second CTSB, the Ethernet network interface card enables the spectrum spreading of the Ethernet network interface card.

Step 3 is a configuration phase of enabling or not enabling the spectrum spreading, namely, the configuration phase described in FIG. 4.

It should be understood that step 1 and step 2 may be performed simultaneously, or step 1 may be performed before step 2. This is not limited thereto.

Step 4: The I/O controller transmits service data to the Ethernet network interface card via the retimer. Step 4 is the link active/service interaction phase described in FIG. 4.

Figure 8:
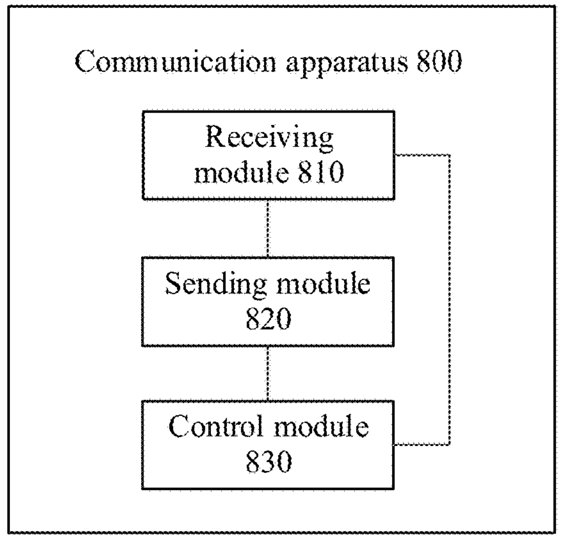
FIG. 8 is a schematic block diagram of a communication apparatus according to an embodiment of this disclosure.

An embodiment of this disclosure provides a communication apparatus. FIG. 8 is a schematic block diagram of a communication apparatus 800 according to an embodiment of this disclosure. The apparatus may be the first apparatus in the method embodiment of this disclosure. The communication apparatus 800 includes: a receiving module 810, configured to receive a first TSB sent by a second apparatus, where the first TSB includes second spread spectrum capability information of the second apparatus; and a sending module 820, configured to send a second TSB to the second apparatus, where the second TSB includes first indication information, and the first indication information indicates the second apparatus to enable or not to enable spectrum spreading.

Optionally, the apparatus 800 further includes a control module 830, configured to determine, based on first spread spectrum capability information and the second spread spectrum capability information, whether to enable the spectrum spreading of the second apparatus, where the first spread spectrum capability information is spread spectrum capability information of the apparatus.

Optionally, the sending module 820 is further configured to send a third TSB to the second apparatus, where the third TSB includes the first spread spectrum capability information, and the first spread spectrum capability information is the spread spectrum capability information of the apparatus.

Optionally, the first spread spectrum capability information includes at least one of a first spread spectrum frequency offset supported by the apparatus or indication information indicating whether the apparatus supports spectrum spreading. The second spread spectrum capability information includes at least one of a second spread spectrum frequency offset supported by the second apparatus or indication information indicating whether the second apparatus supports the spectrum spreading.

Optionally, the control module 830 is configured to: if the first spread spectrum capability information indicates that the apparatus supports the spectrum spreading, and the second spread spectrum capability information indicates that the second apparatus supports the spectrum spreading, determine to enable the spectrum spreading of the second apparatus; or if the first spread spectrum capability information indicates that the apparatus does not support the spectrum spreading, and/or the second spread spectrum capability information indicates that the second apparatus does not support the spectrum spreading, determine not to enable the spectrum spreading of the second apparatus.

Optionally, the receiving module 810 is configured to: receive, from a third apparatus, the first TSB sent by the second apparatus, where the first TSB further includes third spread spectrum capability information of the third apparatus; and the sending module 820 is configured to: send the second TSB to the second apparatus via the third apparatus, where the second TSB further includes second indication information, and the second indication information indicates the third apparatus to enable or not to enable spectrum spreading.

Optionally, the control module 830 is further configured to: determine, based on the first spread spectrum capability information, the second spread spectrum capability information, and the third spread spectrum capability information, whether to enable the spectrum spreading of the third apparatus and whether to enable the spectrum spreading of the second apparatus.

Optionally, the sending module 820 is further configured to: send the third TSB to the second apparatus via the third apparatus, where the third TSB that arrives at the second apparatus includes the first spread spectrum capability information of the apparatus and the third spread spectrum capability information, and the third spread spectrum capability information includes at least one of a third spread spectrum frequency offset supported by the third apparatus or indication information indicating whether the third apparatus supports the spectrum spreading.

Optionally, the control module 830 is configured to: if the first spread spectrum capability information indicates that the apparatus supports the spectrum spreading, the second spread spectrum capability information indicates that the second apparatus supports the spectrum spreading, and the third spread spectrum capability information indicates that the third apparatus supports the spectrum spreading, determine to enable the spectrum spreading of the third apparatus and to enable the spectrum spreading of the second apparatus; or if the first spread spectrum capability information indicates that the apparatus does not support the spectrum spreading, the second spread spectrum capability information indicates that the second apparatus does not support the spectrum spreading, and/or the third spread spectrum capability information indicates that the third apparatus does not support the spectrum spreading, determine not to enable the spectrum spreading of the third apparatus and not to enable the spectrum spreading of the second apparatus.

Optionally, the control module 830 is configured to: if the first spread spectrum capability information indicates that the apparatus supports the spectrum spreading, the second spread spectrum capability information indicates that the second apparatus does not support the spectrum spreading, and the third spread spectrum capability information indicates that the third apparatus supports the spectrum spreading, determine to enable the spectrum spreading of the third apparatus and not to enable the spectrum spreading of the second apparatus; or if the first spread spectrum capability information indicates that the apparatus does not support the spectrum spreading, the second spread spectrum capability information indicates that the second apparatus supports the spectrum spreading, and the third spread spectrum capability information indicates that the third apparatus supports the spectrum spreading, determine to enable the spectrum spreading of the third apparatus and to enable the spectrum spreading of the second apparatus.

Optionally, the TSB includes a type indication field, a payload field, and a CRC field, where the type indication field indicates that the TSB is a discovery TSB or a configuration TSB, the payload field is used to carry the spread spectrum capability information or the indication information indicating that the spectrum spreading is enabled or not enabled, and the CRC field is used to check the TSB.

Optionally, when the TSB is the discovery TSB, a first bit in the payload field is used to carry the first spread spectrum capability information, a second bit in the payload field is used to carry the second spread spectrum capability information, and a third bit in the payload field is used to carry the third spread spectrum capability information; or when the TSB is the configuration TSB, a first bit in the payload field is used to carry the first indication information, and a second bit in the payload field is used to carry the second indication information.

Figure 9:
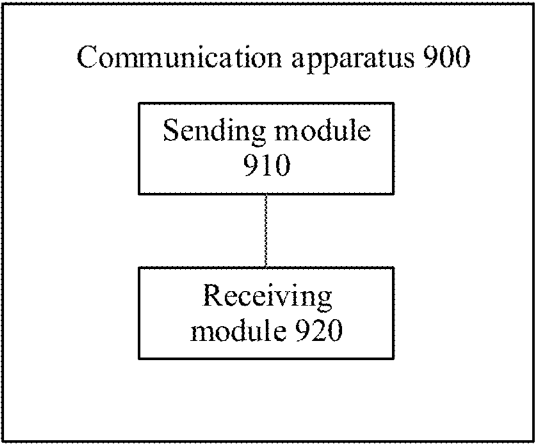
FIG. 9 is a schematic block diagram of another communication apparatus according to an embodiment of this disclosure.

An embodiment of this disclosure provides a communication apparatus. FIG. 9 is a schematic block diagram of a communication apparatus 900 according to an embodiment of this disclosure. The apparatus may be the second apparatus in the method embodiment of this disclosure. The communication apparatus 900 includes: a sending module 910, configured to send a first TSB to a first apparatus, where the first TSB includes second spread spectrum capability information of the apparatus, and the second spread spectrum capability information is used by the first apparatus to determine whether to enable spectrum spreading of the apparatus; and a receiving module 920, configured to receive a second TSB sent by the first apparatus, where the second TSB includes first indication information, and the first indication information indicates the apparatus to enable or not to enable the spectrum spreading.

Optionally, the receiving module 920 is further configured to receive a third TSB sent by the first apparatus, where the third TSB includes first spread spectrum capability information of the first apparatus.

Optionally, the first spread spectrum capability information includes at least one of a first spread spectrum frequency offset supported by the first apparatus or indication information indicating whether the first apparatus supports spectrum spreading. The second spread spectrum capability information includes at least one of a second spread spectrum frequency offset supported by the apparatus or indication information indicating whether the apparatus supports the spectrum spreading.

Optionally, the sending module 910 is configured to send the first TSB to the first apparatus via a third apparatus, where the first TSB that arrives at the first apparatus includes third spread spectrum capability information of the third apparatus and the second spread spectrum capability information, and the third spread spectrum capability information includes at least one of a third spread spectrum frequency offset supported by the third apparatus or indication information indicating whether the third apparatus supports spectrum spreading; and the receiving module 920 is configured to receive, from the third apparatus, the second TSB sent by the first apparatus, where the second TSB further includes second indication information, and the second indication information indicates the third apparatus to enable or not to enable the spectrum spreading.

Optionally, the receiving module 920 is further configured to receive, from the third apparatus, the third TSB sent by the first apparatus, where the third TSB includes the first spread spectrum capability information of the first apparatus and the third spread spectrum capability information.

Figure 10:
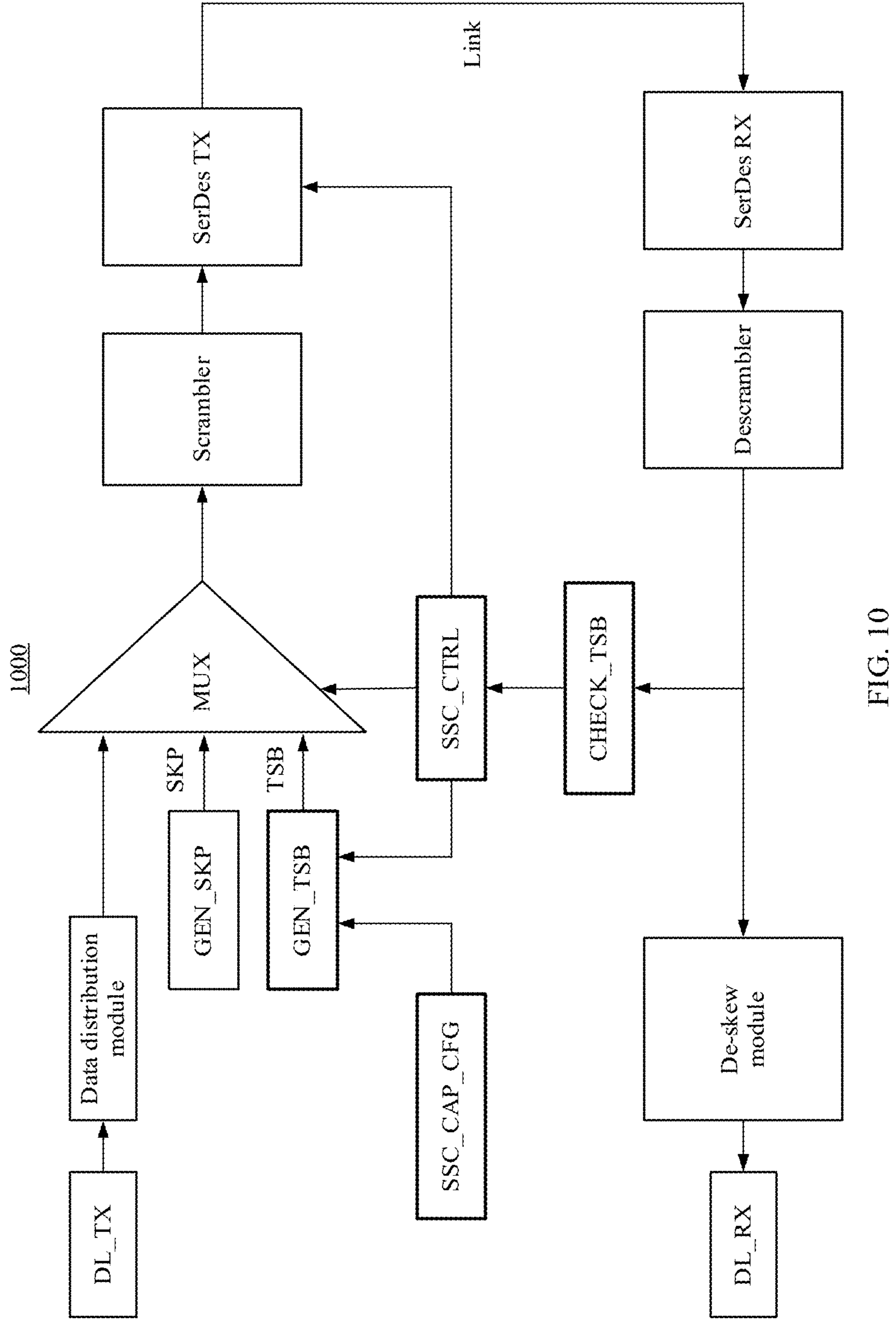
FIG. 10 is a schematic block diagram of another communication apparatus according to an embodiment of this disclosure.

An embodiment of this disclosure provides a communication apparatus. FIG. 10 is a schematic block diagram of a communication apparatus 1000 according to an embodiment of this disclosure. The apparatus may be the first apparatus in embodiments of this disclosure, and the apparatus may be the I/O controller in the SoC in FIG. 2. The communication apparatus 1000 includes:

(1) a data link layer transmitter (DL_TX) responsible for sending valid service data to a physical layer transmitter (PL_TX);

(2) a data distribution module that distributes data obtained through forward error correction (FEC), and arranges the data to each physical lane;

(3) a GEN_TSB that generates a TSB and sends the TSB to a multiplexer (MUX);

(4) a GEN_SKP that generates an SKP and send the SKP to the MUX;

(5) an SSC_CTRL that determines spread spectrum capability information output by a CHECK_TSB, controls the GEN_TSB to generate a TSB carrying SSC control information, and controls the GEN_SKP to periodically send an SKP at a specific frequency, where the SSC control information may include the first indication information and the second indication information;

(6) an SSC_CAP_CFG that is a register that implements related SSC configurations, including a configuration of enabling or not enabling an SSC and a capability configuration of supporting the SSC;

(7) the MUX that is controlled by the SSC_CTRL, selects one piece of information from input data, TSB, and SKP, and outputs the information to a scrambler;

(8) the scrambler responsible for scrambling sent data;

(9) a SerDes TX that converts data output by the scrambler into a serial bitstream and sends the serial bitstream to a wired high-speed serial link;

(10) a SerDes RX responsible for receiving serial data from the wired high-speed serial link, performing serial-to-parallel conversion, and sending parallel data to a descrambler;

(11) the descrambler responsible for performing frame delimitation and descrambling processing on data;

(12) the CHECK_TSB that identifies a TSB from received data and parses the spread spectrum capability information carried in the TSB;

(13) a de-skew module that performs inter-lane de-skew processing on received data; and

(14) a data link layer receiver (DL_RX) responsible for receiving data from a physical layer receiver (PL_RX).

The control module 830 in the communication apparatus 800 in this embodiment of this disclosure includes the GEN_TSB, the SSC_CTRL, the SSC_CAP_CFG, and the CHECK_TSB.

Figure 11:
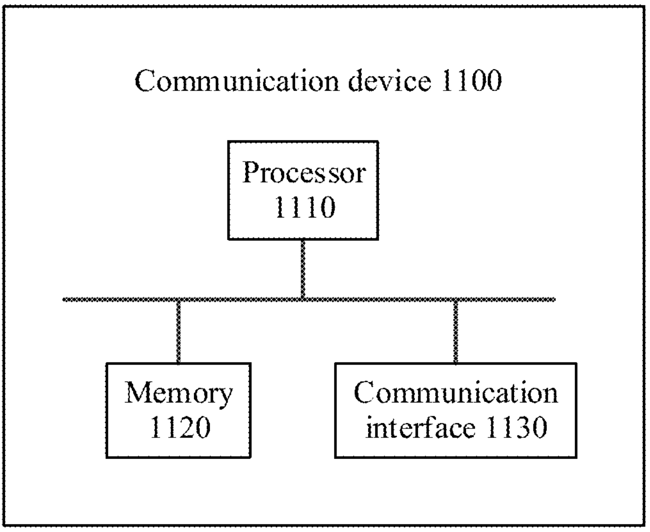
FIG. 11 is a schematic block diagram of a communication device according to an embodiment of this disclosure.

An embodiment of this disclosure provides a communication device 1100. FIG. 11 is a schematic block diagram of the communication device 1100 according to an embodiment of this disclosure.

The communication device 1100 includes a processor 1110, a memory 1120, and a communication interface 1130.

The memory 1120 is configured to store executable instructions.

The processor 1110 is coupled to the memory 1120 through the communication interface 1130. The processor 1110 is configured to invoke and run the executable instructions in the memory 1120, to implement the method in embodiments of this disclosure. The communication device may include the first apparatus or the second apparatus in embodiments of this disclosure.

The processor 1110 may be an integrated circuit chip, and has a signal processing capability. In an implementation process, steps in the foregoing method embodiments may be completed by using a hardware integrated logic circuit in the processor, or by using instructions in a form of software. The foregoing processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The methods, the steps, and logical block diagrams that are disclosed in embodiments of this disclosure may be implemented or performed. The general-purpose processor may be a microprocessor, or the processor may be any other processor or the like. The steps in the methods disclosed with reference to embodiments of this disclosure may be directly performed and completed by a hardware decoding processor, or may be performed and completed by using a combination of hardware in the decoding processor and a software module. The software module may be located in a mature storage medium in the art, for example, a random-access memory (RAM), a flash memory, a read-only memory (ROM), a programmable read-only memory (PROM), an electrically erasable programmable memory, or a register. The storage medium is located in the memory, and the processor reads information in the memory and completes the steps in the foregoing methods in combination with hardware of the processor.

Optionally, an embodiment of this disclosure further provides a communication device. The communication device includes an I/O interface and a logic circuit. The I/O interface is configured to receive or output information. The logic circuit is configured to perform the method in any one of the foregoing method embodiments.

An embodiment of this disclosure further provides a computer-readable storage medium. The computer-readable storage medium stores a computer program for implementing the method in the foregoing method embodiment. When the computer program is run on a computer or a processor, the computer or the processor is enabled to implement the method in the foregoing method embodiment.

An embodiment of this disclosure further provides a computer program product. The computer program product includes computer program code. When the computer program code is run on a computer, the method in the foregoing method embodiment is performed.

An embodiment of this disclosure further provides a chip, including a processor. The processor is connected to a memory, and the memory is configured to store a computer program. The processor is configured to execute the computer program stored in the memory, so that the chip performs the method in the foregoing method embodiment.

It should be understood that, in embodiments of this disclosure, numbers "first", "second", and the like are merely used to distinguish between different objects, for example, to distinguish between different apparatuses, and do not constitute a limitation on the scope of embodiments of this disclosure. Embodiments of this disclosure are not limited thereto.

In addition, the term "and/or" in this disclosure describes only an association relationship for describing associated objects and represents that three relationships may exist. For example, A and/or B may represent the following three cases: only A exists, both A and B exist, and only B exists. In addition, the character "/" in this specification usually represents an "or" relationship between associated objects. In this disclosure, the term "at least one" may represent "one" and "two or more". For example, at least one of A, B, and C may represent the following seventh cases: only A exists, only B exists, only C exists, both A and B exist, both A and C exist, and both C and B exist, and A, B, C all exist.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

A person skilled in the art may clearly learn that, for the purpose of convenient and brief description, for a specific working process of the foregoing system, apparatuses, and units, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to other technologies, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method applicable to a wired link, comprising:

receiving, by a first apparatus and from a second apparatus, a first training block (TB) comprising second spread spectrum capability information of the second apparatus, wherein the second spread spectrum capability information comprises at least one of a second spread spectrum frequency offset supported by the second apparatus or third indication information indicating whether the second apparatus supports spectrum spreading; and sending, by the first apparatus, to the second apparatus, and in response to receiving the first TB, a second TB comprising first indication information instructing the second apparatus to enable or not to enable spectrum spreading.

2. The method of claim 1, wherein before sending the second TB, the method further comprises determining, by the first apparatus based on first spread spectrum capability information of the first apparatus and the second spread spectrum capability information, whether to enable the spectrum spreading of the second apparatus.

3. The method of claim 2, wherein the first spread spectrum capability information comprises at least one of a first spread spectrum frequency offset supported by the first apparatus or second indication information indicating whether the first apparatus supports the spectrum spreading.

4. The method of claim 2, wherein determining whether to enable the spectrum spreading of the second apparatus comprises:

determining, by the first apparatus, to enable the spectrum spreading of the second apparatus when the first spread spectrum capability information indicates that the first apparatus supports the spectrum spreading and the second spread spectrum capability information indicates that the second apparatus supports the spectrum spreading; and determining, by the first apparatus, not to enable the spectrum spreading of the second apparatus when the first spread spectrum capability information indicates that the first apparatus does not support the spectrum spreading or the second spread spectrum capability information indicates that the second apparatus does not support the spectrum spreading.

5. The method of claim 1, further comprising sending, by the first apparatus and to the second apparatus, a third TB comprising first spread spectrum capability information of the first apparatus.

6. The method of claim 1, wherein receiving the first TB comprises receiving, by the first apparatus and from the second apparatus via a third apparatus, the first TB, wherein the first TB further comprises third spread spectrum capability information of the third apparatus, wherein sending the second TB comprises sending, by the first apparatus and to the second apparatus via the third apparatus, the second TB, and wherein the second TB further comprises second indication information instructing the third apparatus to enable or not to enable the spectrum spreading.

7. The method of claim 6, wherein before sending the second TB, the method further comprises determining, by the first apparatus and based on first spread spectrum capability information of the first apparatus, the second spread spectrum capability information, and the third spread spectrum capability information, whether to enable the spectrum spreading of the third apparatus and the spectrum spreading of the second apparatus.

8. The method of claim 1, wherein the second TB comprises a type indication field, a payload field, and a cyclic redundancy check (CRC) field, wherein the type indication field indicates that the second TB is a discovery training sequences block or a configuration training sequences block, wherein the payload field carries the second spread spectrum capability information or the first indication information, and wherein the CRC field is for checking the second TB.

9. The method of claim 1, wherein instructing the second apparatus to enable the spectrum spreading comprises instructing the second apparatus to modulate, by using a low-frequency clock, a reference clock by a clock chip or a spread spectrum generator, and wherein instructing the second apparatus not to enable the spectrum spreading comprises instructing the second apparatus to skip modulating the reference clock by the clock chip or the spread spectrum generator.

10. The method of claim 1, wherein when the second spread spectrum capability information comprises the second spread spectrum frequency offset, the method further comprises determining, by the first apparatus based on a first spread spectrum frequency offset supported by the first apparatus and the second spread spectrum frequency offset, a first target spread spectrum frequency offset when the first apparatus determines to enable the spectrum spreading of the second apparatus, and wherein the first indication information carries the first target spread spectrum frequency offset.

11. The method of claim 10, wherein determining the first target spread spectrum frequency offset comprises:

determining, by the first apparatus, that the first target spread spectrum frequency offset is equal to the first spread spectrum frequency offset when the first spread spectrum frequency offset is greater than or equal to the second spread spectrum frequency offset; and determining, by the first apparatus, that the first target spread spectrum frequency offset is equal to the second spread spectrum frequency offset when the first spread spectrum frequency offset is less than the second spread spectrum frequency offset.

12. The method of claim 10, further comprising using, by the second apparatus, the first target spread spectrum frequency offset to determine a frequency at which a skip (SKP) is inserted.

13. A first apparatus, comprising:

a memory configured to store instructions; and a processor coupled to the memory and configured to execute the instructions to:

receive, from a second apparatus, a first training block (TB) comprising second spread spectrum capability information of the second apparatus, wherein the second spread spectrum capability information comprises at least one of a second spread spectrum frequency offset supported by the second apparatus or third indication information indicating whether the second apparatus supports spectrum spreading; and send, to the second apparatus and in response to receiving the first TB, a second TB comprising first indication information instructing the second apparatus to enable or not to enable spectrum spreading.

14. The first apparatus of claim 13, wherein before sending the second TB, the processor is further configured to execute the instructions to determine, based on first spread spectrum capability information of the first apparatus and the second spread spectrum capability information, whether to enable or not enable the spectrum spreading of the second apparatus.

15. The first apparatus of claim 14, wherein the first spread spectrum capability information comprises at least one of a first spread spectrum frequency offset supported by the first apparatus or second indication information indicating whether the first apparatus supports the spectrum spreading.

16. The first apparatus of claim 15, wherein the processor is further configured to execute the instructions to:

determine to enable the spectrum spreading of the second apparatus when the first spread spectrum capability information indicates that the first apparatus supports the spectrum spreading and the second spread spectrum capability information indicates that the second apparatus supports the spectrum spreading; and determine not to enable the spectrum spreading of the second apparatus when the first spread spectrum capability information indicates that the first apparatus does not support the spectrum spreading or the second spread spectrum capability information indicates that the second apparatus does not support the spectrum spreading.

17. The first apparatus of claim 13, wherein when the second spread spectrum capability information comprises the second spread spectrum frequency offset, the processor is further configured to execute the instructions to determine, by the first apparatus based on a first spread spectrum frequency offset supported by the first apparatus and the second spread spectrum frequency offset, a first target spread spectrum frequency offset when the first apparatus determines to enable the spectrum spreading of the second apparatus, and wherein the first indication information carries the first target spread spectrum frequency offset.

18. The first apparatus of claim 17, wherein the processor is further configured to execute the instructions to determine the first target spread spectrum frequency offset by:

determining, by the first apparatus, that the first target spread spectrum frequency offset is equal to the first spread spectrum frequency offset when the first spread spectrum frequency offset is greater than or equal to the second spread spectrum frequency offset; and determining, by the first apparatus, that the first target spread spectrum frequency offset is equal to the second spread spectrum frequency offset when the first spread spectrum frequency offset is less than the second spread spectrum frequency offset.

19. The first apparatus of claim 17, wherein the first target spread spectrum frequency offset is configured to be used by the second apparatus to determine a frequency at which a skip (SKP) is inserted.

20. A computer program product comprising instructions that are stored on a non-transitory computer-readable storage medium and that, when executed by at least one processor, cause a first apparatus for communication based on a wired link to:

receive, from a second apparatus, a first training block (TB) comprising second spread spectrum capability information of the second apparatus, wherein the second spread spectrum capability information comprises at least one of a second spread spectrum frequency offset supported by the second apparatus or third indication information indicating whether the second apparatus supports spectrum spreading; and send, to the second apparatus and in response to receiving the first TB, a second TB comprising first indication information instructing the second apparatus to enable or not to enable spectrum spreading.

* * * * *